(12) United States Patent
Takeda et al.

(10) Patent No.: US 9,731,767 B2
(45) Date of Patent: Aug. 15, 2017

(54) VEHICLE-BODY FRONT STRUCTURE

(71) Applicant: HONDA MOTOR CO., LTD., Tokyo (JP)

(72) Inventors: Tomoya Takeda, Wako (JP); Ken Yasui, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/278,891

(22) Filed: Sep. 28, 2016

(65) Prior Publication Data

US 2017/0088180 A1 Mar. 30, 2017

(30) Foreign Application Priority Data

Sep. 29, 2015 (JP) ................................. 2015-191428

(51) Int. Cl.
*B62D 21/00* (2006.01)
*B62D 21/15* (2006.01)
*B62D 25/08* (2006.01)

(52) U.S. Cl.
CPC ........... *B62D 21/152* (2013.01); *B62D 25/08* (2013.01)

(58) Field of Classification Search
CPC .............................. B62D 21/152; B62D 25/08
USPC .......................... 296/187.1, 187.09, 203.02
See application file for complete search history.

(56) References Cited

U.S. PATENT DOCUMENTS

| 7,533,913 | B2 * | 5/2009 | Bae | ........................ B60R 19/34 293/132 |
| 8,789,877 | B2 * | 7/2014 | Ohnaka | ................ B62D 21/152 296/187.09 |
| 2006/0028052 | A1 * | 2/2006 | Dandekar | ............ B62D 21/152 296/187.09 |
| 2013/0320710 | A1 * | 12/2013 | Watanabe | ............ B62D 25/082 296/187.09 |

FOREIGN PATENT DOCUMENTS

JP 5357953 B2 12/2013
JP 2015-9712 A 1/2015

* cited by examiner

*Primary Examiner* — Joseph D Pape
(74) *Attorney, Agent, or Firm* — Westerman, Hattori, Daniels & Adrian, LLP

(57) ABSTRACT

In a vehicle-body front structure, a bumper beam is bridged between left and right front side frames. The left front side frame includes a front load absorption portion coupled with the bumper beam, and a rear load absorption portion provided at the vehicle rear side of the left gusset. A front wall of the left gusset is housed in an inner portion of the left front side frame, and the front wall is joined with an inner side wall of the left front side frame. Further, the front wall is sandwiched between front and rear frame back plates in the vehicle front-rear direction.

12 Claims, 14 Drawing Sheets

VEHICLE-BODY FRONT STRUCTURE

CROSS REFERENCES TO RELATED APPLICATIONS

The present application claims priority under 35 U.S.C. §119 to Japanese Patent Application No. 2015-191428, filed Sep. 29, 2015, entitled "Vehicle-body Front Structure." The contents of this application are incorporated herein by reference in their entirety.

TECHNICAL FIELD

The present disclosure relates to a vehicle-body front structure including a front side frame and an upper member coupled to each other through a gusset.

BACKGROUND

There is known a vehicle-body front structure in which a gusset extends from an inner portion of a front side frame to the outside of the vehicle front side, and a front end portion of an upper member is joined with an outer end portion of the gusset. Since the gusset extends from the inner portion of the front side frame, the gusset is strongly joined with the inner portion of the front side frame (see, for example, Japanese Patent No. 5357953).

Hence, for example, if a relatively large impact load is input to the front end portion of the upper member due to a small overlap collision of the vehicle, the input impact load can be transmitted to the front side frame through the gusset. Accordingly, the front side frame is deformed by the impact load of the small overlap collision, and the impact load can be absorbed.

The small overlap collision represents that a front side part which is ¼ of a front part of a vehicle collides with an obstacle, such as a tree or a utility pole.

In the vehicle-body front structure described in Japanese Patent No. 5357953, impact absorption members respectively protrude from front end portions of left and right front side frames, and a bumper beam is bridged between front end portions of the left and right impact absorption members. Hence, in case of a front collision of the vehicle, an impact load is input to the bumper beam, the input impact load deforms the impact absorption members, and the impact load can be absorbed by the impact absorption members.

There is also known a vehicle-body front structure in which a gusset is fixed to an inner portion of a front end portion of a front side frame, the fixed gusset protrudes to the outside in the vehicle width direction, and an impact absorption member protrudes from a front end portion of the gusset (see, for example, Japanese Unexamined Patent Application Publication No. 2015-9712).

In the vehicle-body front structure described in Japanese Unexamined Patent Application Publication No. 2015-9712, a bumper beam is bridged between front end portions of left and right impact absorption members, and outer end portions of the bumper beam extend to the outside in the vehicle width direction of gussets.

Hence, the impact load of the small overlap collision can be transmitted from the outer end portions of the bumper beam to the front side frames through the gussets. Accordingly, the front side frames are deformed by the impact load of the small overlap collision, and the impact load can be absorbed.

Also, in case of the front collision of the vehicle, an impact load is input to the bumper beam, the input impact load deforms the impact absorption members, and the impact load can be absorbed by the impact absorption members.

However, the vehicle-body front structures described in Japanese Patent No. 5357953 and Japanese Unexamined Patent Application Publication No. 2015-9712 each are required to additionally prepare the impact absorption members in order to absorb the impact load due to the front collision of the vehicle. Hence, the number of parts of the vehicle-body front structure increases, and this disturbs a decrease in cost. In addition, since the impact absorption members protrude from the front end portions of the front side frames, this disturbs a decrease in vehicle total length.

Further, in the vehicle-body front structure described in Japanese Unexamined Patent Application Publication No. 2015-9712, the outer end portions of the bumper beam extend to the outside in the vehicle width direction of the gussets. Owing to this, the total length of the bumper beam increases, and the weight of the bumper beam increases, thereby disturbing a decrease in weight of the vehicle.

SUMMARY

For example, it is desirable to provide a vehicle-body front structure that can properly absorb an impact load while an increase in the number of parts and an increase in the vehicle total length are suppressed and while the total length of a bumper beam is held small.

A first aspect of the disclosure provides a vehicle-body front structure including left and right front side frames each having a front end portion, an inner side wall, and an outer side wall; a bumper beam bridged between the front end portions of the front side frames; gussets respectively extending from the front side frames to outside in a vehicle width direction, and each having an outer end portion and a front wall; and upper members each having a front end portion, the front end portions of the upper members being coupled with the outer end portions of the gussets. The front side frames each include a front load absorption portion having a front end portion coupled with the bumper beam, and configured to be axially crushed by an impact load that is input to the bumper beam from a vehicle front side, and a rear load absorption portion provided at a vehicle rear side of the gusset, and configured to be bent by the impact load. In a state where the front wall of the gusset is housed in an inner portion of the front side frame and is joined with the inner side wall of the front side frame, the front wall of the gusset is sandwiched by the outer side wall of the front side frame in a vehicle front-rear direction.

As described above, the front side frame includes the front load absorption portion and the rear load absorption portion. Also, the bumper beam is bridged between the front end portions of the left front load absorption portion and the right front load absorption portion. Hence, the front load absorption portion can be deformed to be axially crushed by the impact load input to the bumper beam due to the front collision of the vehicle. Accordingly, the front load absorption portion can absorb initial-phase energy of the impact load.

Further, after the front load absorption portion absorbs the initial-phase energy of the impact load, the rear load absorption portion is bent and hence can absorb later-phase energy of the impact load. Accordingly, acceleration acting on an occupant in a vehicle chamber can be decreased.

Also, the front side frame is divided into the front load absorption portion and the rear load absorption portion, and the front load absorption portion is configured to be axially crushed. Accordingly, the additional impact absorption member that protrudes from the front end portion of the front side frame is no longer required, and the increase in the number of parts can be suppressed. Further, since the additional impact absorption member is no longer required, the increase in the total length of the vehicle can be suppressed.

That is, while the increase in the number of parts and the increase in the total length of the vehicle are suppressed, the impact load input to the bumper beam can be properly absorbed.

Further, the gusset extends from the front side frame to the outside in the vehicle width direction, and the front end portion of the upper member is coupled with the outer end portion of the gusset. Further, the front wall of the gusset is housed in the inner portion of the front side frame and is joined with the inner side wall of the front side frame. In addition, the front wall of the gusset is sandwiched by the outer side wall of the front side frame in the vehicle front-rear direction. Accordingly, the gusset can be strongly coupled with the front side frame.

In this state, in case of the small overlap collision of the vehicle, the impact load can be input to the front end portion of the upper member. Accordingly, the impact load input to the front end portion of the upper member can be transmitted to the rear load absorption portion through the gusset. That is, the impact load of the small overlap collision can be transmitted to the rear load absorption portion although the total length of the bumper beam is suppressed to the front side frames at the inside in the vehicle width direction of the upper members.

Hence, the rear load absorption portion can be deformed to be bent by the impact load transmitted to the rear load absorption portion. Accordingly, while the total length of the bumper beam is held small, the impact load due to the small overlap collision can be properly absorbed, and the weight of the vehicle can be decreased.

According to a second aspect of the disclosure, preferably, the front side frames each may include a frame main body having a substantially U-shaped cross section being open to the outside in the vehicle width direction, and a frame back plate forming the outer side wall of the front side frame and closing the opening of the frame main body. The frame main body and the frame back plate may cause the front side frame to have a closed cross section. The gussets each may include a gusset main body having a substantially U-shaped cross section being open to the vehicle rear side, and a gusset back plate closing the opening of the gusset main body. The gusset main body and the gusset back plate may cause the gusset to have a closed cross section. The gusset main body may include the front wall having an inner flange, the frame main body may include the inner side wall, and the inner flange of the front wall may be joined with the inner side wall of the frame main body. The frame back plate may include a front frame back plate and a rear frame back plate, and the front wall may be sandwiched between the front frame back plate and the rear frame back plate in the vehicle front-rear direction.

As described above, the opening of the frame main body is closed with the frame back plate, and hence the front side frame is formed to have the closed cross section. Also, the opening of the gusset main body is closed with the gusset back plate, and hence the gusset is formed to have the closed cross section.

Accordingly, the frame main body, the frame back plate, the gusset main body, and the gusset back plate can be easily formed by pressing a steel sheet. That is, the front side frame and the gusset can be easily formed.

Further, the gusset main body includes the inner flange at the front wall. The inner flange is joined with the inner side wall of the frame main body. Also, the frame back plate is divided into the front frame back plate and the rear frame back plate. Further, the front wall is sandwiched between the divided frame back plates in the vehicle front-rear direction.

Accordingly, the gusset main body (that is, the gusset) can be easily assembled with the front side frame.

According to a third aspect of the disclosure, preferably, the frame main body may include the inner side wall having an upper edge and a lower edge, an upper portion protruding from the upper edge of the inner side wall to the outside in the vehicle width direction, and a lower portion protruding from the lower edge of the inner side wall to the outside in the vehicle width direction. The upper portion and the lower portion may be joined with the gusset.

As described above, the gusset is joined with the upper portion and the lower portion of the frame main body. Accordingly, the gusset can be strongly joined with the front side frame, and the joint strength between the gusset and the front side frame can be increased.

According to a fourth aspect of the disclosure, preferably, the frame main body may include an upper ridge portion formed by intersection of the inner side wall and the upper portion, and a lower ridge portion formed by intersection of the inner side wall and the lower portion. The ridge portions each may be branched into two at the front load absorption portion and hence an inclined portion is formed. The inclined portion may have a rear end portion, and the gusset main body may be joined with the rear end portion of the inclined portion.

As described above, the frame main body includes the upper ridge portion and the lower ridge portion. Also, the ridge portions each are branched into two at the front load absorption portion and hence the inclined portion is formed. As described above, by dividing the ridge portions with high intensities into two, the rigidity of the front load absorption portion can be properly decreased.

Accordingly, the front load absorption portion can be deformed to be further properly axially crushed by the impact load input to the bumper beam, and the front load absorption portion can properly absorb the impact load.

Also, the gusset main body is joined with the rear end portion of the inclined portion. Hence, the impact load of the small overlap collision can be efficiently transmitted to the rear load absorption portion through the upper ridge portion and the lower ridge portion having the high rigidities. Accordingly, the rear load absorption portion can be promoted to be bent by the impact load, and the rear load absorption portion can properly absorb the impact load.

According to a fifth aspect of the disclosure, preferably, the front load absorption portion may include a plurality of horizontal beads extending in the vehicle width direction, and a plurality of vertical beads provided at positions shifted from the horizontal beads by a predetermined pitch in the vehicle front-rear direction and extending in an up-down direction.

As described above, the front load absorption portion includes the plurality of horizontal beads and the plurality of vertical beads. Accordingly, the front load absorption portion can be promoted to be further properly axially crushed by the impact load input to the bumper beam, and the front load absorption portion can properly absorb the impact load.

According to a sixth aspect of the disclosure, preferably, the vehicle-body front structure may further include an attachment bracket joined in a state where the attachment bracket is inserted into an opening of the front load absorption portion, and attached to the bumper beam.

As described above, the attachment bracket is attached to the bumper beam for joining in the state where the attachment bracket is inserted into the opening of the front load absorption portion. Hence, the bumper beam can be strongly attached to the front load absorption portion (that is, the front side frame).

Accordingly, the impact load input to the bumper beam can be reliably transmitted to the front load absorption portion through the attachment bracket, and the axial crush of the front load absorption portion can be further properly promoted.

According to a seventh aspect of the disclosure, preferably, the gussets each may extend from the front side frame to the vehicle front side and to the outside in the vehicle width direction in an inclined manner. The gussets each may have an outer end portion, and a housing recess portion formed at the outer end portion of the gusset and configured to house the front end portion of the upper member. In a state where the front end portion of the upper member is housed in the housing recess portion, the front end portion of the upper member may be joined with the housing recess portion.

As described above, the gusset extends in an inclined manner from the front side frame to the outside of the vehicle front side. Accordingly, the outer end portion of the gusset can be arranged at the vehicle front side. Further, the front end portion of the upper member is coupled with the outer end portion of the gusset. Hence, the front end portion of the upper member extends to the vehicle front side, and a large length of the upper member can be ensured.

Accordingly, a large deformation amount of the upper member can be ensured, and the amount of absorbing the impact load by the upper member can be increased.

Also, the housing recess portion is formed at the outer end portion of the gusset. The front end portion of the upper member is housed in the housing recess portion, and the front end portion of the upper member is joined with the housing recess portion. That is, the front end portion of the upper member can be strongly coupled with the outer end portion of the gusset.

Hence, the impact load input to the front end portion of the upper member is efficiently transmitted to the gusset, and the load transmitted to the gusset can be transmitted to the front side frame. Accordingly, the impact load input to the front end portion of the upper member can be reliably dispersed into the front side frame and the upper member.

According to an eighth aspect of the disclosure, preferably, the rear load absorption portion may include a first bend portion provided at the vehicle rear side of the gusset, and having a recess portion formed so that the outer side wall of the front side frame is recessed to inside in the vehicle width direction, a second bend portion arranged at the vehicle rear side of the first bend portion, and is able to be bent in the vehicle width direction, and a third bend portion arranged at the vehicle rear side of the second bend portion, and is able to be bent in the vehicle width direction.

As described above, the front side frame includes the first bend portion, the second bend portion, and the third bend portion. Further, the first bend portion has the recess portion formed at the outer side wall of the front side frame. Hence, the first bend portion can be bent to the inside in the vehicle width direction by the impact load input to the front side frame from the vehicle front side.

Accordingly, the front side frame can be bent substantially horizontally at the first bend portion, the second bend portion, and the third bend portion, and the amount of absorbing the impact load by the front side frame can be increased.

With the present disclosure, while the increase in the number of parts and the increase in the total length of the vehicle are suppressed, the impact load input to the bumper beam can be properly absorbed. Also, while the total length of the bumper beam is held small, the impact load due to the small overlap collision can be properly absorbed.

BRIEF DESCRIPTION OF THE DRAWINGS

The advantages of the disclosure will become apparent in the following description taken in conjunction with the following drawings.

DETAILED DESCRIPTION

A preferred embodiment for implementing the present disclosure is described below with reference to the accompanying drawings. It is to be noted that "front (Fr)," "rear (Rr)," "left (L)," and "right (R)" are directions when viewed from a driver.

Embodiment

A vehicle-body front structure 10 according to an embodiment is described.

Figure 1:
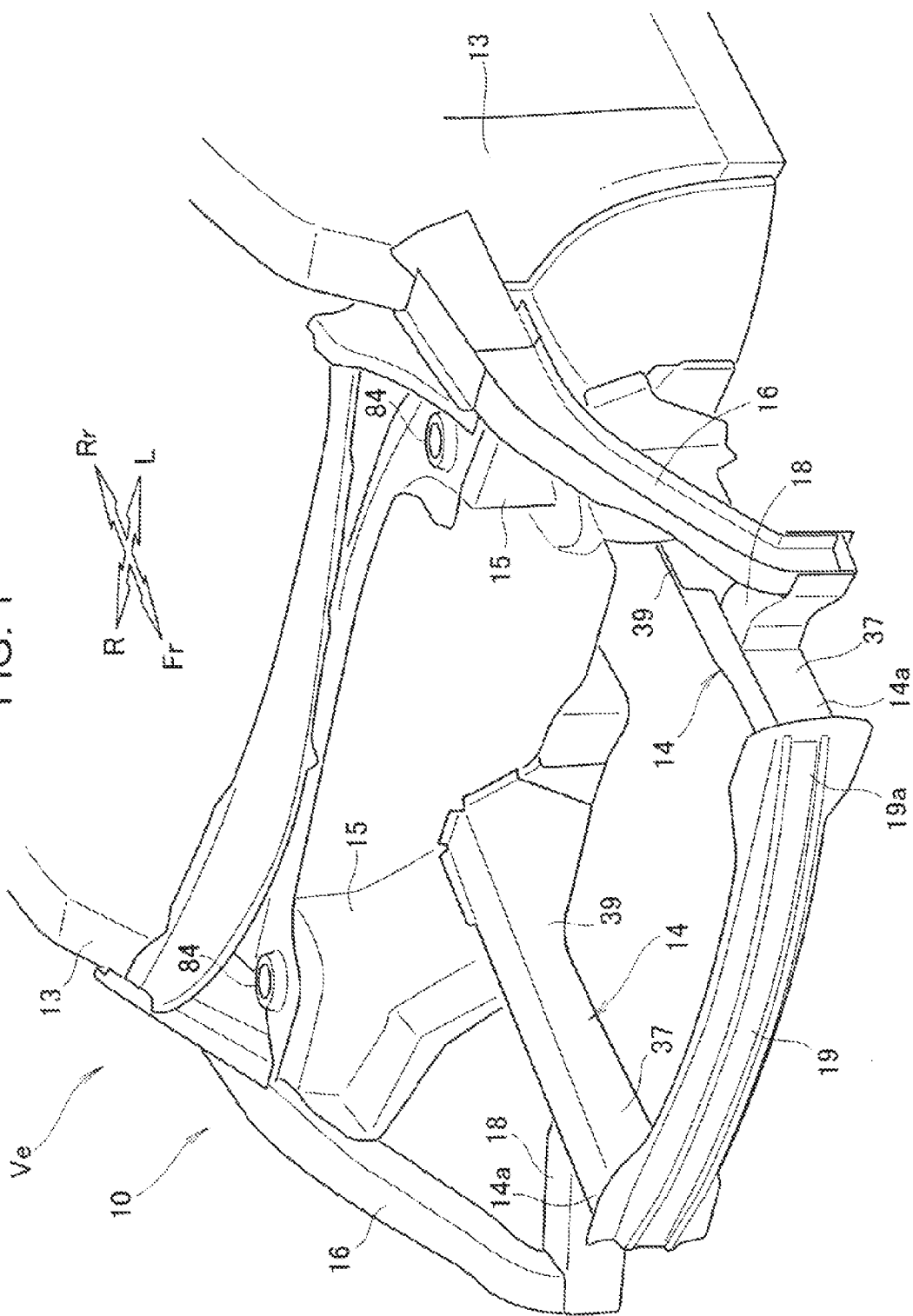
FIG. 1 is a perspective view showing a vehicle-body front structure according to an embodiment of the present disclosure.

As shown in FIG. 1, the vehicle-body front structure 10 is a part configuring a front structure of a vehicle Ve. The vehicle-body front structure 10 includes front side frames 14 respectively extending from the inside in the vehicle width direction of a left front pillar 13 and the inside in the vehicle width direction of a right front pillar 13 to the vehicle front side, damper housings 15 respectively vertically extending from the front side frames 14 to the vehicle front side of the front pillars 13, and upper members 16 respectively extending from the front pillars 13 through the damper housings 15 to the vehicle front side.

Also, the vehicle-body front structure 10 includes a left gusset 18 that couples the left upper member 16 with the left front side frame 14, a right gusset 18 that couples the right upper member 16 with the right front side frame 14, and a bumper beam 19 bridged between front end portions 14a of the left front side frame 14 and the right front side frame 14.

The vehicle-body front structure 10 has a substantially left-right symmetrical structure. Hence, the same reference sign is applied to a left member and a right member of the vehicle-body front structure 10, the left member is described in detail, and the description of the right member is omitted.

Figure 2:
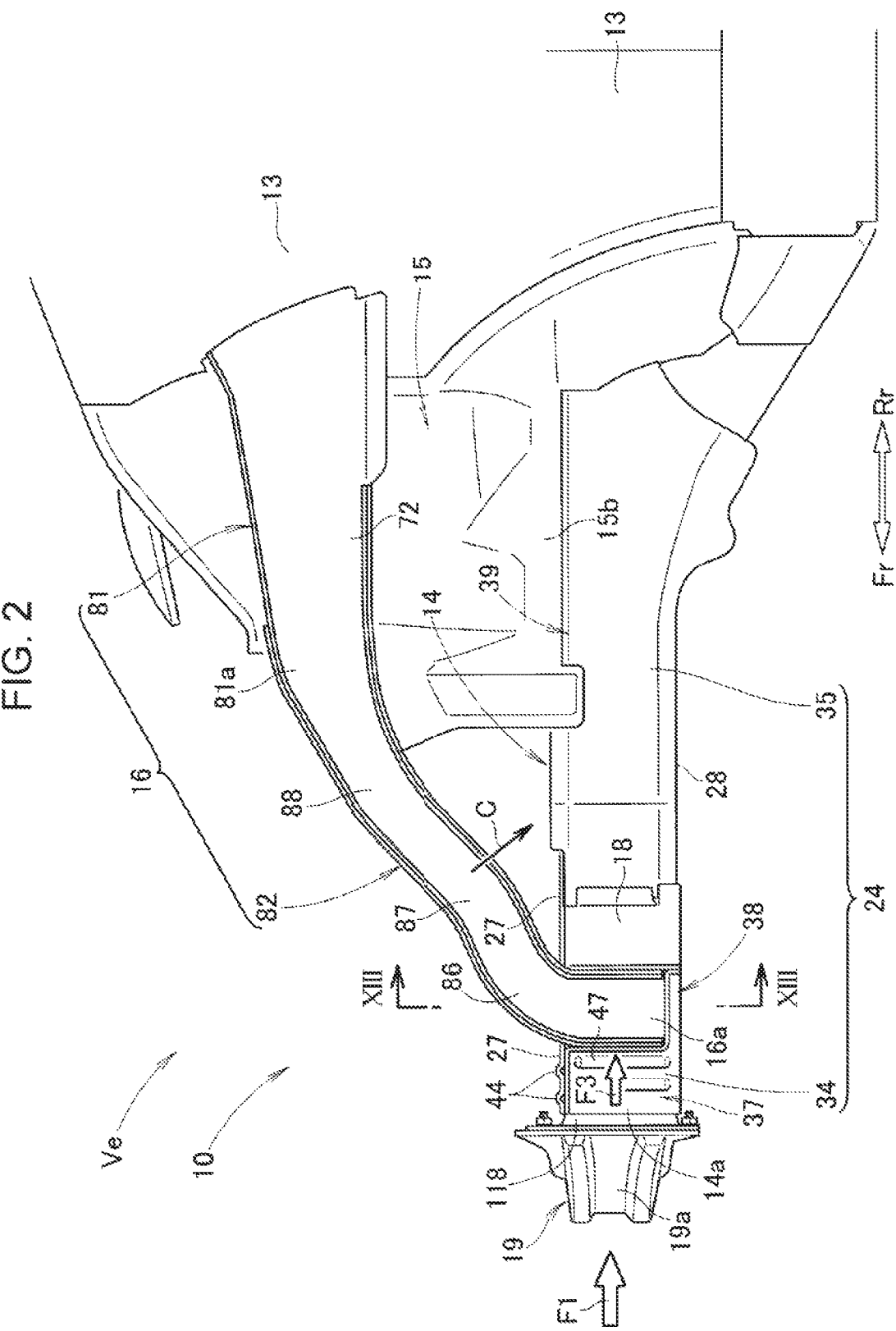
FIG. 2 is a side view showing the vehicle-body front structure in FIG. 1.
Figure 3:
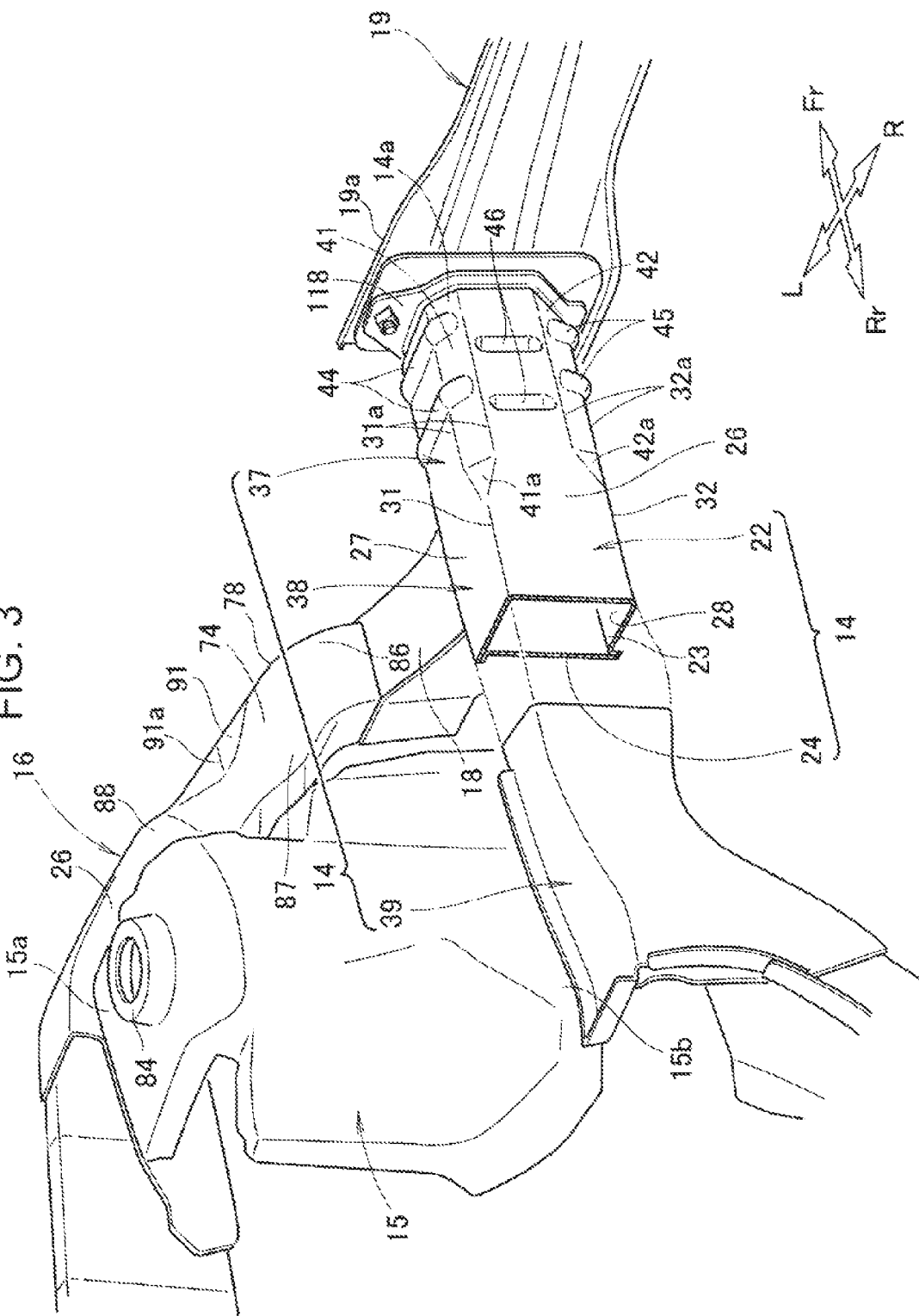
FIG. 3 is a perspective view when a left side portion of the vehicle-body front structure in FIG. 1 is viewed from the rear of the inside of the vehicle.

As shown in FIGS. 2 and 3, the left front side frame 14 includes a frame main body 22 having a substantially U-shaped (angular C-shaped) cross section being open to the outside in the vehicle width direction, and a frame back plate 24 that closes an opening 23 of the frame main body 22.

The frame main body 22 includes an inner side wall 26 arranged at the inside in the vehicle width direction, an upper portion 27 protruding from an upper edge of the inner side wall 26 to the outside in the vehicle width direction, and a lower portion 28 protruding from a lower edge of the inner side wall 26 to the outside in the vehicle width direction. The inner side wall 26, the upper portion 27, and the lower portion 28 cause the frame main body 22 to have the substantially U-shaped cross section being open to the outside in the vehicle width direction.

Further, the frame main body 22 includes an upper ridge portion 31 formed by intersection of the inner side wall 26 and the upper portion 27, and a lower ridge portion 32 formed by intersection of the inner side wall 26 and the lower portion 28. The upper ridge portion 31 is branched into two ridge portions 31a at a front load absorption portion 37 (described later). Also, the lower ridge portion 32 is branched into two ridge portions 32a at the front load absorption portion 37 (described later), similarly to the upper ridge portion 31.

Since the opening 23 of the frame main body 22 is closed with the frame back plate 24, the frame main body 22 and the frame back plate 24 cause the left front side frame 14 to have a substantially rectangular closed cross section. That is, the frame back plate 24 forms an outer side wall 24 of the left front side frame 14.

In this case, the frame back plate 24 includes a front frame back plate 34 provided at the vehicle front side of the left gusset 18, and a rear frame back plate 35 provided at the vehicle rear side of the left gusset 18.

In other words, the frame back plate 24 is divided into two of the front frame back plate 34 and the rear frame back plate 35.

Also, the left front side frame 14 includes the front load absorption portion 37 coupled with a left end portion 19a of the bumper beam 19, a gusset joint portion 38 disposed on the vehicle rear side of the front load absorption portion 37 and extending rearward, and a rear load absorption portion 39 disposed on the vehicle rear side of the gusset joint portion 38 and extending rearward.

At the front load absorption portion 37, since the upper ridge portion 31 is branched into the two ridge portions 31a, an upper inclined portion 41 is formed between the two ridge portions 31a. Also, since the lower ridge portion 32 is branched into the two ridge portions 32a, a lower inclined portion 42 is formed between the two ridge portions 32a.

That is, the front load absorption portion 37 is formed to have a substantially rectangular closed cross section by a front portion of the inner side wall 26, the upper inclined portion 41, a front portion of the upper portion 27, the lower inclined portion 42, a front portion of the lower portion 28, and a front portion of the frame back plate 24.

This front load absorption portion 37 includes a plurality of upper horizontal beads (horizontal beads) 44 extending in the vehicle width direction, a plurality of lower horizontal beads (horizontal beads) 45 extending in the vehicle width direction, a plurality of inner vertical beads (vertical beads) 46 extending in the up-down direction, and a plurality of outer vertical beads (vertical beads) 47 (see FIG. 5) extending in the up-down direction.

The plurality of upper horizontal beads 44 are arranged at the front portion of the upper portion 27 and the upper inclined portion 41, bulge to the outside of the front load absorption portion 37, and are formed at an interval in the vehicle front-rear direction.

The plurality of lower horizontal beads 45 are arranged at the front portion of the lower portion 28 and the lower inclined portion 42, bulge to the outside of the front load absorption portion 37, and are formed on extension lines of the plurality of upper horizontal beads 44 at an interval in the vehicle front-rear direction.

The plurality of inner vertical beads 46 are arranged at the front portion of the inner side wall 26, bulge to the inside of the front load absorption portion 37, and are formed at positions shifted by a predetermined pitch in the vehicle front-rear direction with respect to the upper horizontal beads 44 and the lower horizontal beads 45.

The plurality of outer vertical beads 47 are arranged at the front portion of the outer side wall 24, bulge to the inside of the front load absorption portion 37, and are formed at positions shifted by a predetermined pitch in the vehicle front-rear direction with respect to the upper horizontal beads 44 and the lower horizontal beads 45.

Figure 10:
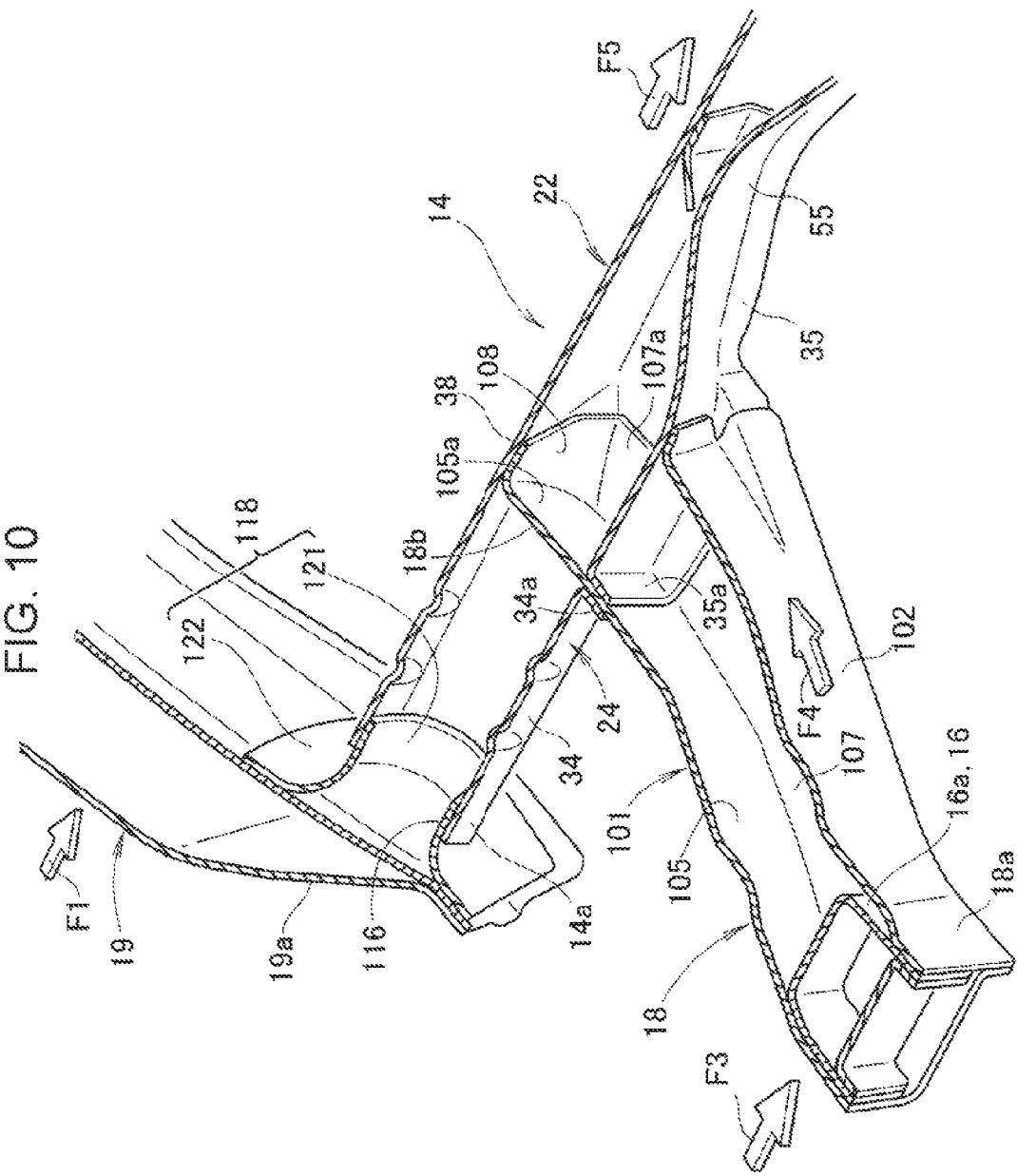
FIG. 10 is an enlarged perspective view showing a front portion of the left side portion of the vehicle-body front structure in FIG. 5.

The front end portion 14a of the left front side frame 14 of this front load absorption portion 37 is coupled with the left end portion 19a of the bumper beam 19 through an attachment bracket 118 (see also FIG. 10).

In this state, the plurality of upper horizontal beads 44, the plurality of lower horizontal beads 45, the plurality of inner vertical beads 46, and the plurality of outer vertical beads 47 are formed at the front load absorption portion 37. Hence, the front load absorption portion 37 is formed to be axially crushed by an impact load F1 input to the bumper beam 19 from the vehicle front side.

Accordingly, the front load absorption portion 37 can be promoted to be properly axially crushed by the impact load F1. The front load absorption portion 37 can properly absorb the impact load F1.

In this case, the upper ridge portion 31 of the frame main body 22 is branched into the two ridge portions 31a at the front load absorption portion 37. Also, the lower ridge portion 32 of the frame main body 22 is branched into the two ridge portions 32a at the front load absorption portion 37. In this way, since the upper ridge portion 31 and the lower ridge portion 32 with high rigidities each are divided into two, the rigidity of the front load absorption portion 37 is properly decreased.

Hence, the front load absorption portion 37 can be deformed to be properly axially crushed by the impact load F1 input to the bumper beam 19. Accordingly, the front load absorption portion 37 can properly absorb the impact load F1.

Figure 4:
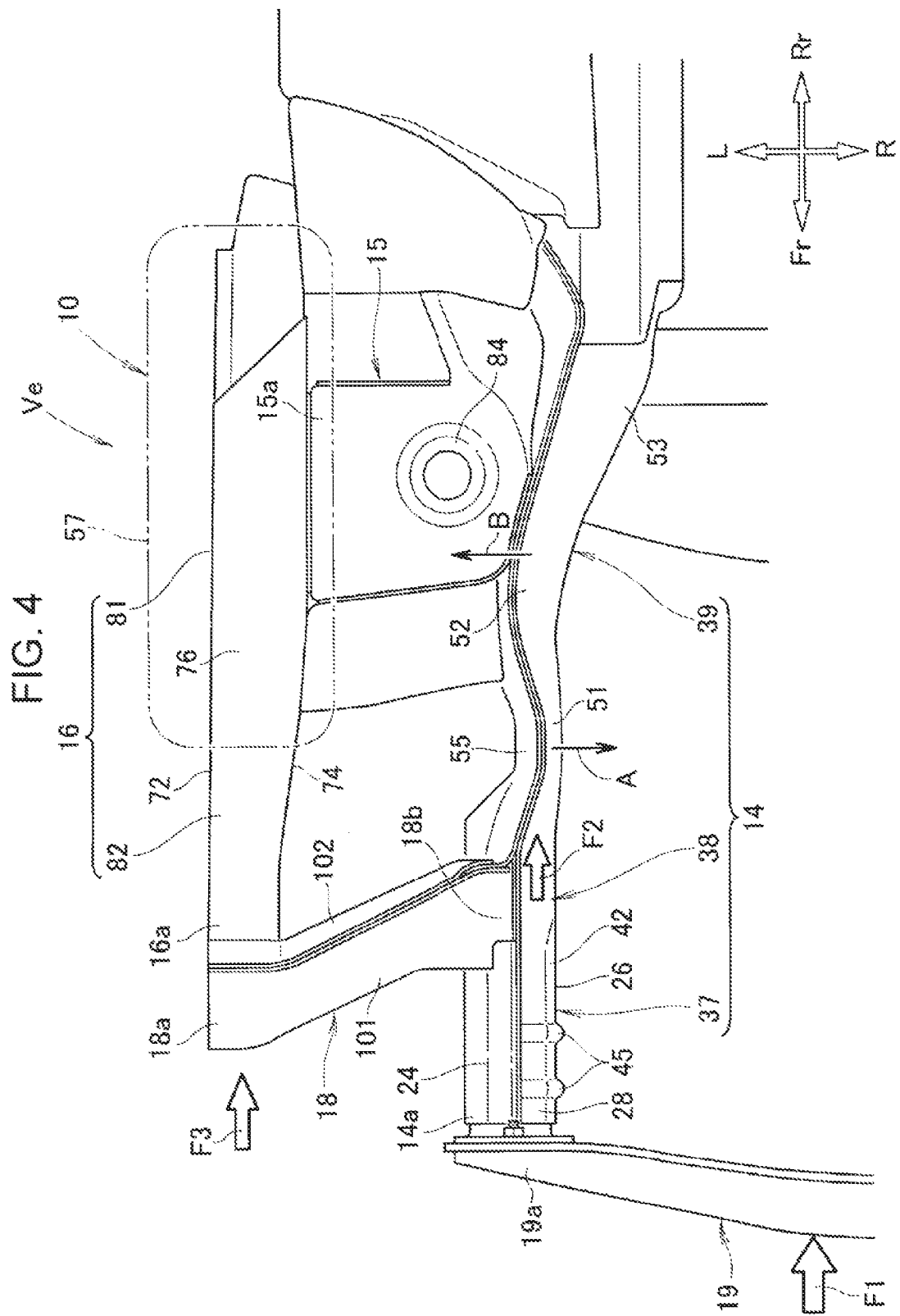
FIG. 4 is a bottom view showing the left side portion of the vehicle-body front structure in FIG. 1.
Figure 5:
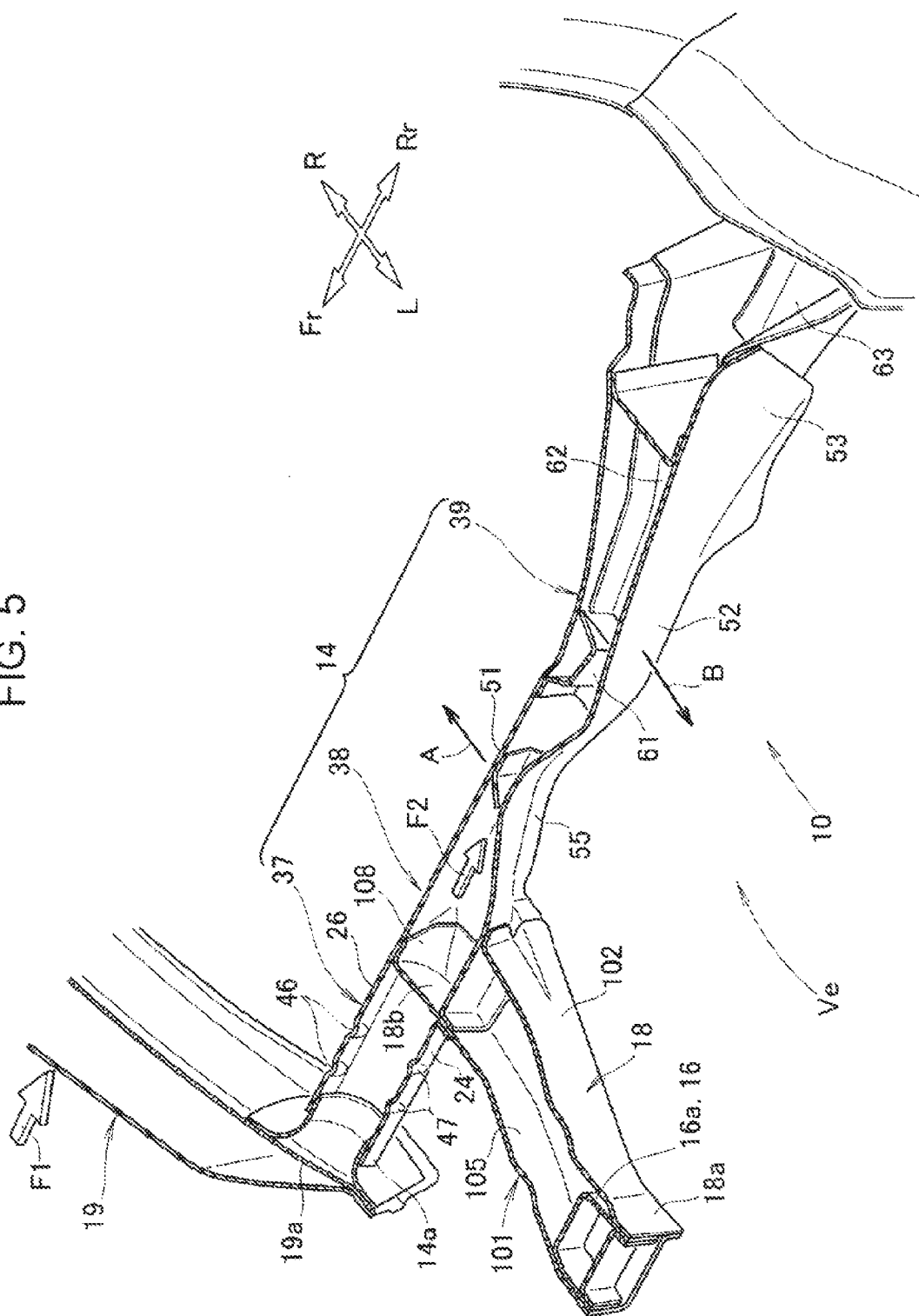
FIG. 5 is a fracture perspective view showing the left side portion of the vehicle-body front structure in FIG. 1.

As shown in FIGS. 4 and 5, the rear load absorption portion 39 extends from the gusset joint portion 38 to the vehicle rear side. The rear load absorption portion 39 includes three bend portions (that is, flexure portions) of a first bend portion 51 provided at the vehicle rear side of the left gusset 18, a second bend portion 52 provided at the vehicle rear side of the first bend portion 51, and a third bend portion 53 provided at the vehicle rear side of the second bend portion 52.

The first bend portion 51 has a recess portion 55 near the vehicle rear side of the left gusset 18, in the outer side wall 24 of the left front side frame 14. The recess portion 55 is formed so that the outer side wall 24 is recessed to the inside in the vehicle width direction. Since the recess portion is formed at the outer side wall 24, when a left front wheel 57 is steered in the left-right direction, the left front wheel 57 is prevented from interfering with the outer side wall 24.

Further, since the recess portion 55 is formed at the first bend portion 51, if an impact load F2 is input to the first bend portion 51 from the vehicle front side, the first bend portion 51 is bent substantially horizontally as indicated by arrow A to the inside in the vehicle width direction.

Also, the rear load absorption portion 39 includes a first reinforcement member 61, a second reinforcement member 62, and a third reinforcement member 63 adjacently arranged sequentially to the vehicle rear side. To be specific, the first reinforcement member 61 is provided at the vehicle rear side of the first bend portion 51. Also, the second reinforcement member 62 is adjacently provided at the vehicle rear side of the first reinforcement member 61. Further, the third reinforcement member 63 is adjacently provided at the vehicle rear side of the second reinforcement member 62.

The first reinforcement member 61, the second reinforcement member 62, and the third reinforcement member 63 are members that reinforce the rear load absorption portion 39.

In this case, since the first reinforcement member 61 and the second reinforcement member 62 are adjacently provided at the rear load absorption portion 39, a relatively large strength difference is generated between the first reinforcement member 61 and the second reinforcement member 62.

Hence, a stress is concentrated between the first reinforcement member 61 and the second reinforcement member 62, and deformation of the rear load absorption portion 39 can be promoted. That is, the second bend portion 52 is formed between the first reinforcement member 61 and the second reinforcement member 62.

Accordingly, the first bend portion 51 is bent substantially horizontally to the inside in the vehicle width direction by the impact load F2 input to the first bend portion 51, the second bend portion 52 is bent substantially horizontally as indicated by arrow B to the outside in the vehicle width direction.

Also, since the second reinforcement member 62 and the third reinforcement member 63 are adjacently provided at the rear load absorption portion 39, a relatively large strength difference is generated between the second reinforcement member 62 and the third reinforcement member 63. Hence, a stress is concentrated between the second reinforcement member 62 and the third reinforcement member 63, and deformation of the rear load absorption portion 39 can be promoted. That is, the third bend portion 53 is formed between the second reinforcement member 62 and the third reinforcement member 63.

Accordingly, the first bend portion 51 is bent substantially horizontally to the inside in the vehicle width direction, the second bend portion 52 is bent substantially horizontally to the outside in the vehicle width direction, and the third bend portion 53 is properly bent, by the impact load F2 input to the first bend portion 51.

In this way, since the first bend portion 51, the second bend portion 52, and the third bend portion 53 are substantially horizontally bent by the impact load F2 input to the rear load absorption portion 39 from the vehicle front side, the amount of absorbing the impact load F2 by the rear load absorption portion 39 can be increased.

In this way, the left front side frame 14 includes the front load absorption portion 37 and the rear load absorption portion 39. Further, the bumper beam 19 is bridged between the front end portion 14a of the left front load absorption portion 37 (that is, the left front side frame 14) and the front end portion 14a (see FIG. 1) of the right front load absorption portion 37 (that is, the right front side frame 14).

In this state, if the impact load F1 is input to the bumper beam 19 by the front collision of the vehicle Ve, the front load absorption portion 37 can be deformed to be axially crushed by the input impact load F1. Hence, the front load absorption portion 37 can absorb initial-phase energy of the impact load F1.

Further, after the front load absorption portion 37 absorbs the initial-phase energy of the impact load F1, the rear load absorption portion 39 can be bent. Hence, the rear load absorption portion 39 can absorb later-phase energy of the impact load F1.

In this case, a vehicle chamber is formed at the vehicle rear side of the rear load absorption portion 39. Accordingly, acceleration acting on an occupant in the vehicle chamber can be decreased.

Also, since the left front side frame 14 is divided into the front load absorption portion 37 and the rear load absorption portion 39 and the front load absorption portion 37 is axially crushed, the additional impact absorption member that protrudes from the front end portion 14a of the left front side frame 14 is no longer required.

Since the additional impact absorption member is no longer required, an increase in the number of parts can be suppressed, and further an increase in the total length of the vehicle Ve can be suppressed. That is, while the increase in the number of parts and the increase in the total length of the vehicle Ve are suppressed, the impact load F1 input to the bumper beam 19 can be properly absorbed.

Figure 6:
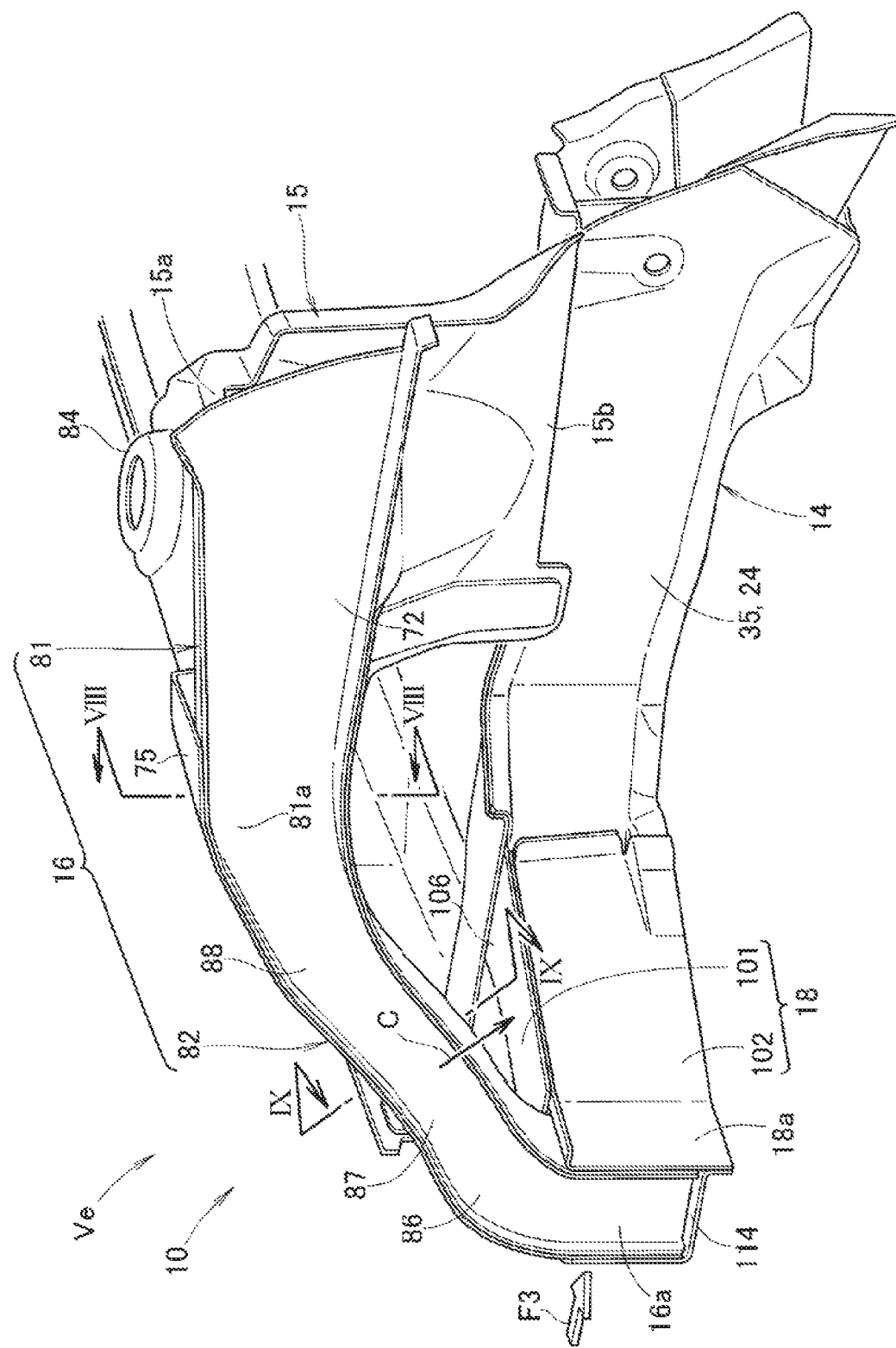
FIG. 6 is a perspective view when the left side portion of the vehicle-body front structure in FIG. 2 is viewed from the rear of the outside of the vehicle.
Figure 7:
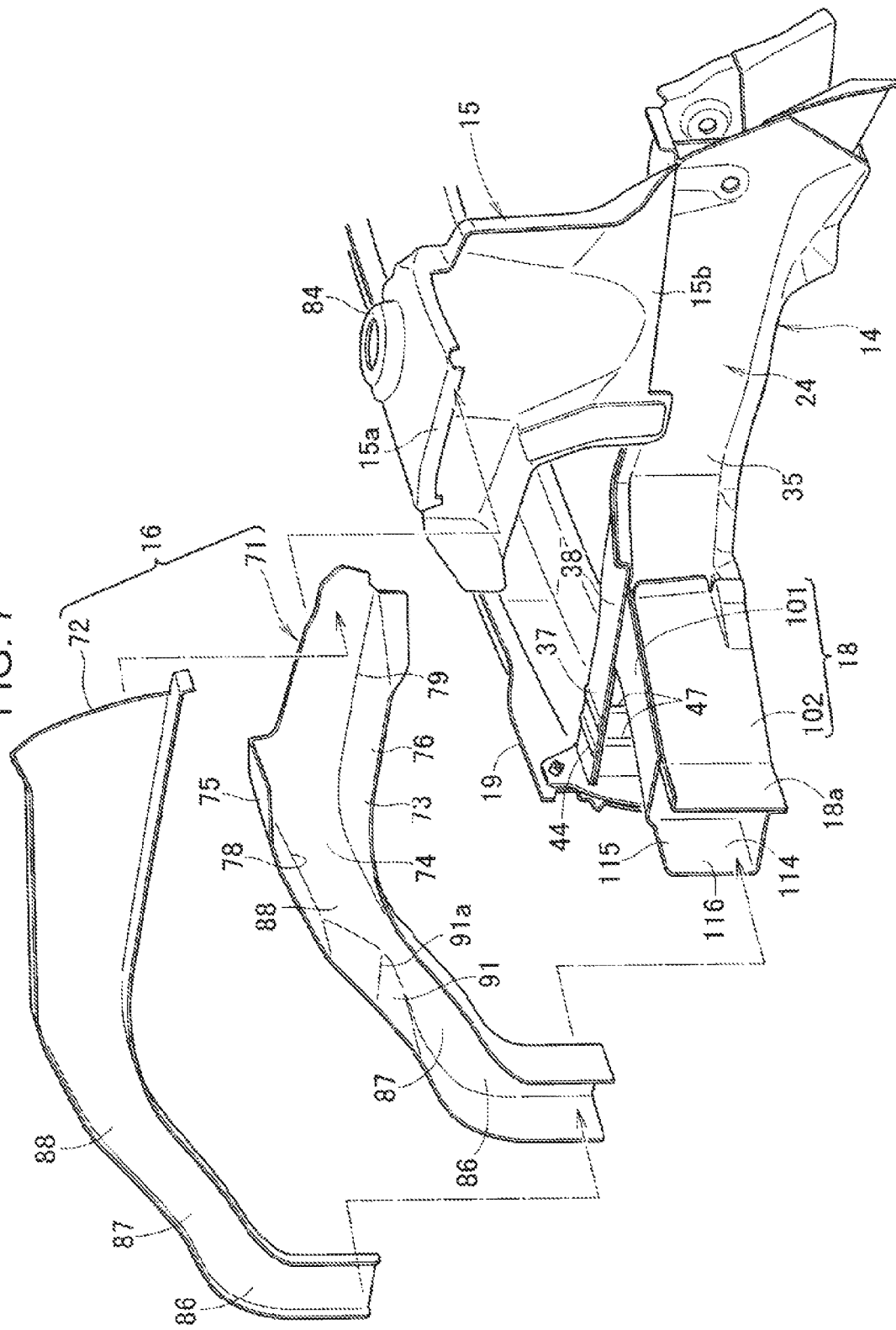
FIG. 7 is an exploded perspective view when a left upper member is separated from the left side portion of the vehicle-body front structure in FIG. 6.

As shown in FIGS. 6 and 7, the left upper member 16 extends from the left front pillar 13 (see FIG. 2) through the damper housing 15 to the vehicle front side. The left upper member 16 extends substantially horizontally from the left front pillar 13 to the left damper housing 15, and extends in an inclined manner from the left damper housing 15 to the lower side.

To be specific, the left upper member 16 includes an upper main body 71 having a substantially U-shaped (angular C-shaped) cross section being open to the outside in the vehicle width direction, and an upper back plate 72 that closes an opening 73 of the upper main body 71.

The upper main body 71 includes an inner side wall 74 arranged at the inside in the vehicle width direction, an upper portion 75 protruding from an upper edge of the inner side wall 74 to the outside in the vehicle width direction, and a lower portion 76 protruding from a lower edge of the inner side wall 74 to the outside in the vehicle width direction. The inner side wall 74, the upper portion 75, and the lower portion 76 cause the upper main body 71 to have the substantially U-shaped cross section being open to the outside in the vehicle width direction.

Figure 8:
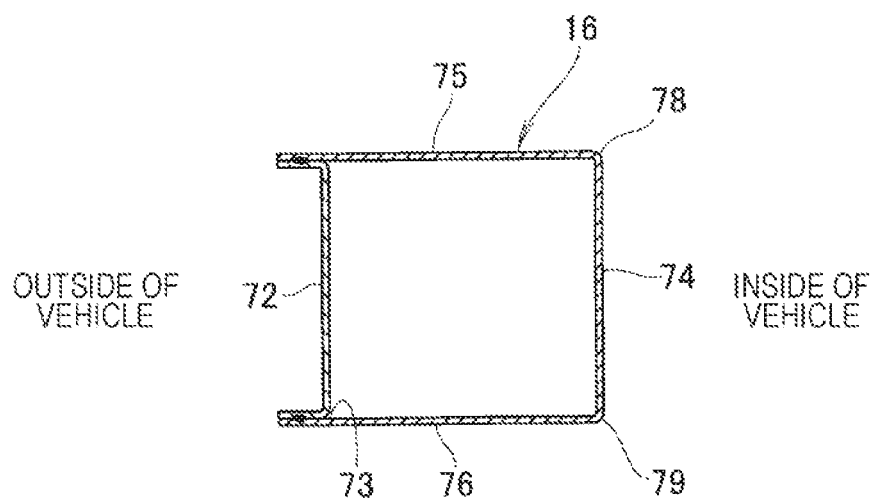
FIG. 8 is a cross-sectional view taken along line VIII-VIII in FIG. 6.

As shown in FIG. 8, the upper main body 71 includes an upper inner ridge portion (one of an upper inner corner portion and an upper outer corner portion) 78 formed by intersection of the inner side wall 74 and the upper portion 75, and a lower inner ridge portion 79 formed by intersection of the inner side wall 74 and the lower portion 76.

Since the opening 73 of the upper main body 71 is closed with the upper back plate 72, the upper main body 71 and the upper back plate 72 cause the left upper member 16 to have a substantially rectangular closed cross section. Accordingly, the upper back plate 72 forms an outer side wall 72 of the left upper member 16.

As shown in FIGS. 2 and 6, the left upper member 16 includes a rear member 81 extending substantially horizontally from the left front pillar 13 to the left damper housing 15, and a front member 82 extending in an inclined manner from the left damper housing 15 to the lower side.

The rear member 81 extends substantially horizontally from the left front pillar 13 to the left damper housing 15, and is joined with a top portion 15a of the left damper housing 15. That is, the top portion 15a of the left damper housing 15 is joined with the inner side wall 26 (see also FIG. 3) of the rear member (that is, the left upper member 16). Further, a bottom portion 15b of the left damper housing 15 is provided at the outer side wall 24 of the left front side frame 14.

A damper of a front suspension is housed in the left damper housing 15 from the outside in the vehicle width direction, and an upper end portion of the damper is supported by a damper base 84 of the left damper housing 15. The damper base 84 is provided at a top portion of the left damper housing 15. That is, the left damper housing 15 is a member with high rigidity to support a load input from the damper.

Hence, since the inner side wall 74 of the rear member 81 is joined with the top portion 15a of the left damper housing 15, the rear member 81 is reinforced by the left damper housing 15, and the rigidity of the rear member 81 is increased. Further, the left damper housing 15 is reinforced by the rear member 81, and the rigidity of the left damper housing 15 is increased.

Accordingly, the damper can be strong by the left damper housing 15, and the support rigidity for the damper by the left damper housing 15 is increased.

The front member 82 extends in an inclined manner from a front end portion 81a of the rear member 81 to the lower side. The front member 82 is a portion formed in a substantially M shape in side view.

Since the front member 82 is formed in the substantially M shape, three curve portions (that is, flexure portions) of a front curve portion 86, a center curve portion 87, and a rear curve portion 88 are formed sequentially to the vehicle rear side.

To be specific, the front curve portion 86 is formed in a curve shape to protrude to the upper side. Also, the center curve portion 87 is formed in a curve shape to protrude to the lower side at the vehicle rear side of the front curve portion 86.

Further, the rear curve portion 88 is formed in a curve shape to protrude to the upper side at the vehicle rear side of the center curve portion 87, at a position adjacent to the front end portion 81a of the rear member 81.

In this way, the front member 82 is formed in a substantially M shape, and includes the three curve portions of the front curve portion 86, the center curve portion 87, and the rear curve portion 88. Hence, the three portions of the front curve portion 86, the center curve portion 87, and the rear curve portion 88 can be deformed in a curved manner by an impact load F3 input to a front end portion 16a of the left upper member 16.

Accordingly, the front member 82 can be largely deformed in a direction as indicated by arrow C by the impact load F3, and the amount of absorbing the impact load F3 by the left upper member 16 can be increased.

Meanwhile, as shown in FIG. 4, the left end portion 19a of the bumper beam 19 is coupled with the front end portion 14a of the left front side frame 14. Hence, the left end portion 19a of the bumper beam 19 is arranged at the inside in the vehicle width direction with respect to the left upper member 16.

That is, the total length of the bumper beam 19 is smaller than the width dimension between the left and right upper members 16 (see FIG. 1 for the right upper member 16). Accordingly, if the vehicle Ve has the small overlap collision, the impact load F3 of the small overlap collision is input to the front end portion 16a of the left upper member 16.

In this case, since the front member 82 of the left upper member 16 is formed in the substantially M shape (see FIG. 2), the amount of absorbing the impact load F3 can be increased. Accordingly, if the vehicle Ve has the small overlap collision, the left upper member 16 can absorb the relatively large impact load F3 input to the front end portion 16a of the left upper member 16.

Further, as shown in FIG. 6, the left upper member 16 includes the rear member 81 and the front member 82. Accordingly, the rear member can increase the support rigidity for the damper by the left damper housing 15.

That is, the left upper member 16 can attain both advantageous effects that the rear member 81 increases the support rigidity for the damper, and that the front member 82 absorbs the impact load F3 due to the small overlap collision.

Figure 9:
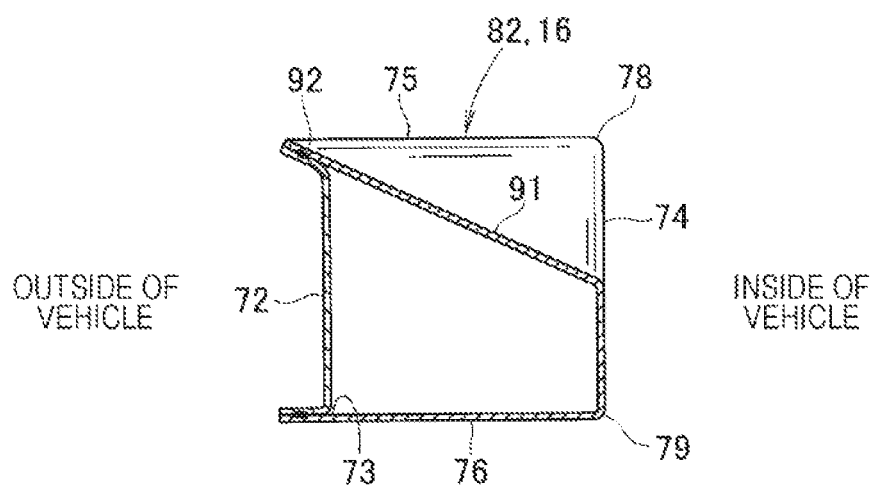
FIG. 9 is a cross-sectional view taken along line IX-IX in FIG. 6.

As shown in FIGS. 7 and 9, at the front member 82, the upper inner ridge portion 78 is formed in a recess shape between the center curve portion 87 and the rear curve portion 88. That is, an inclined portion 91 (see also FIG. 3) is formed between the center curve portion 87 and the rear curve portion 88. The inclined portion 91 is recessed to the inside of the front member 82 with respect to the upper inner ridge portion 78.

The inclined portion 91 is formed to be inclined downward from the outside of the vehicle to the inside of the vehicle in the vehicle width direction. Further, the inclined portion 91 is formed so that a center 91a between the center curve portion 87 and the rear curve portion 88 in the vehicle front-rear direction is most recessed (see also FIG. 3).

That is, the inclined portion 91 is formed in an inclined manner in the vehicle front-rear direction so as to gradually largely recessed from the center curve portion 87 and the rear curve portion 88 to the center 91a.

In this case, for example, if a recessed inclined portion is formed at each of the upper inner ridge portion 78 and an upper outer ridge portion 92, the rigidity becomes too small. Hence, the deformation of the inclined portion 91 of the upper inner ridge portion 78 and the inclined portion of the upper outer ridge portion 92 becomes too promoted. Owing to this, it is difficult to properly transmit the impact load F3 to the three curve portions of the front curve portion 86, the center curve portion 87, and the rear curve portion 88. It is difficult to deform the left upper member 16 at the three portions.

Hence, the recessed inclined portion 91 is formed only at the upper inner ridge portion 78, and the rigidity is properly held. By the impact load F3 input to the front end portion 16a (see FIG. 6) of the left upper member 16, the inclined portion 91 is bent first, and the three portions of the front curve portion 86, the center curve portion 87, and the rear curve portion 88 can be properly bent while the inclined portion 91 serves as the start point.

Accordingly, the front member 82 can be reliably deformed in a bent manner in an M shape.

Referring back to FIG. 4, the left gusset 18 extends from the gusset joint portion 38 of the left front side frame 14 to the outside in the vehicle width direction. To be specific, the left gusset 18 extends in an inclined manner from the gusset joint portion 38 to the vehicle front side and to the outside in the vehicle width direction.

Accordingly, an outer end portion 18a of the left gusset 18 is arranged in a state close to the front end portion 14a of the left front side frame 14 in the vehicle front-rear direction.

Figure 11:
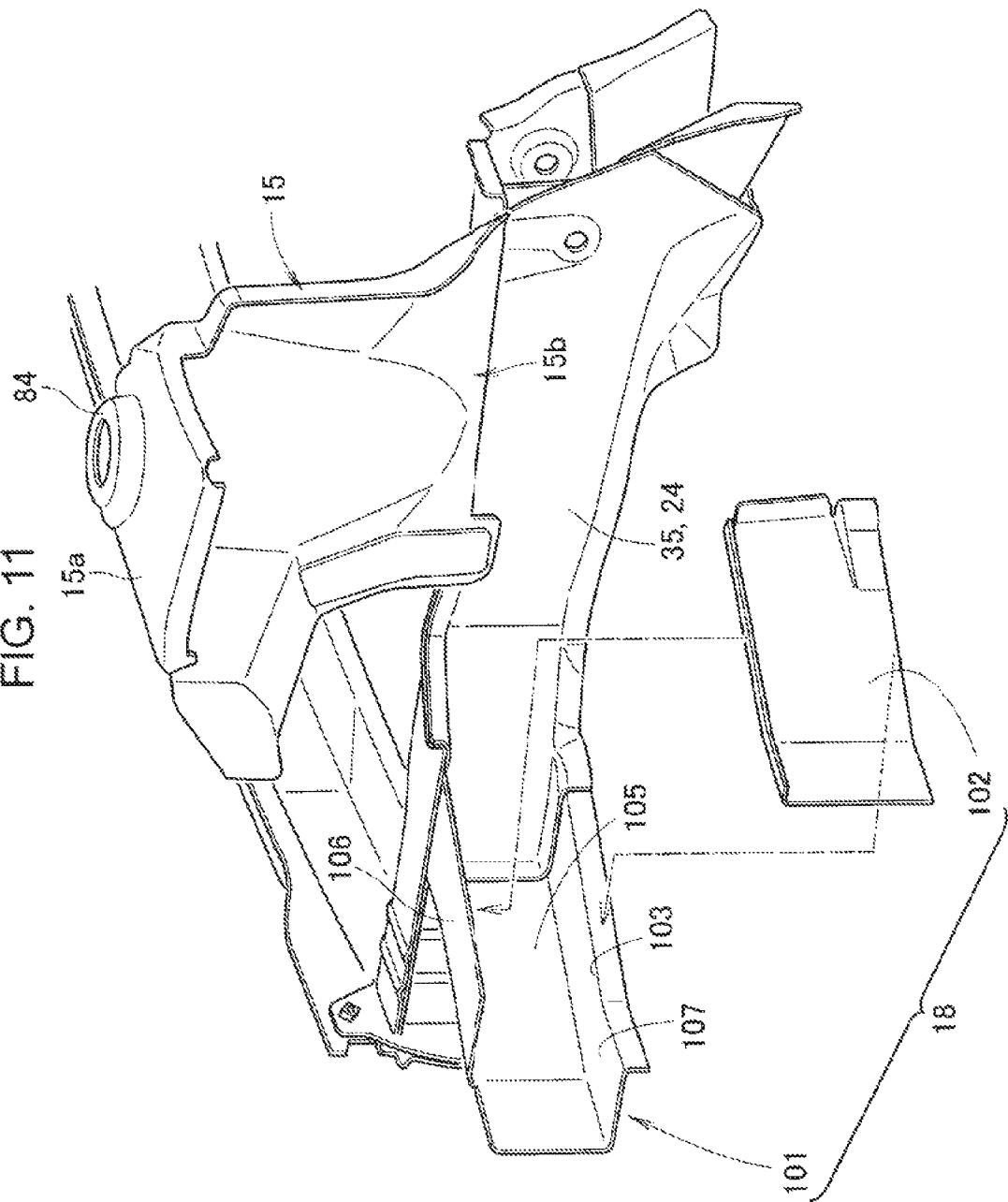
FIG. 11 is an exploded perspective view when a gusset back plate is separated from the left side portion of the vehicle-body front structure in FIG. 7.

As shown in FIGS. 10 and 11, the left gusset 18 includes a gusset main body 101 having a substantially U-shaped (angular C-shaped) cross section being open to the vehicle rear side, and a gusset back plate 102 that closes an opening 103 of the gusset main body 101.

The gusset main body 101 includes a front wall 105 arranged at the front in the vehicle width direction, an upper portion 106 protruding from an upper edge of the front wall 105 to the vehicle rear side, and a lower portion 107 protruding from a lower edge of the front wall 105 to the vehicle rear side. The front wall 105, the upper portion 106, and the lower portion 107 cause the gusset main body 101 to have the substantially U-shaped cross section being open to the vehicle rear side.

Since the opening 103 of the gusset main body 101 is closed with the gusset back plate 102, the gusset main body 101 and the gusset back plate 102 cause the left gusset 18 to have a substantially rectangular closed cross section (see also FIG. 7).

Figure 12:
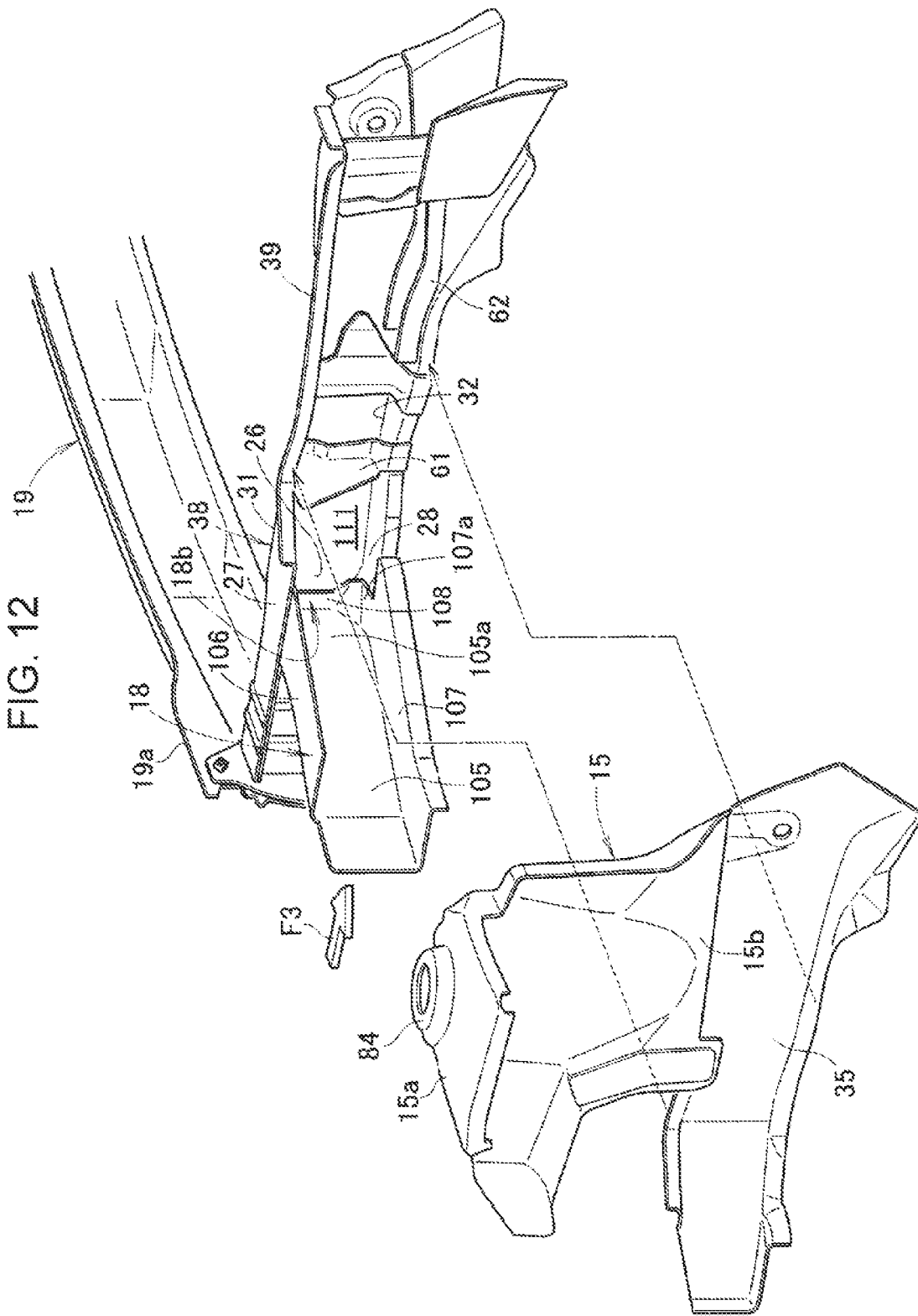
FIG. 12 is an exploded perspective view when a damper housing and rear frame back plate are exploded from the left side portion of the vehicle-body front structure in FIG. 11.
Figure 13:
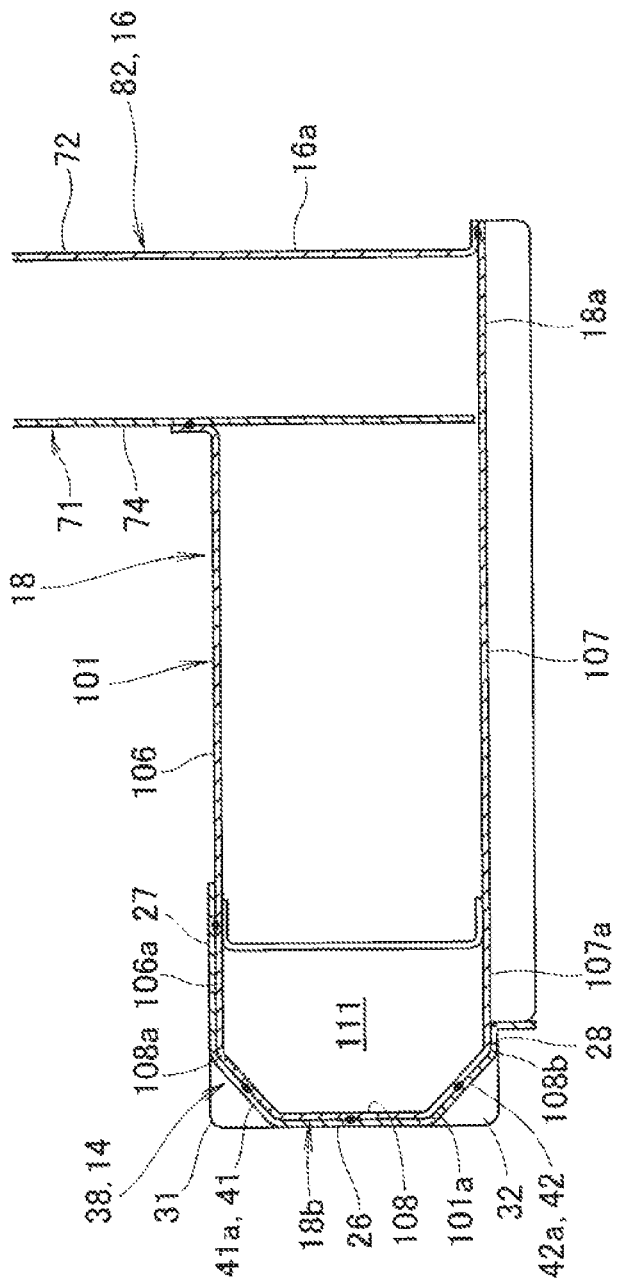
FIG. 13 is a cross-sectional view taken along line XIII-XIII in FIG. 2.

As shown in FIGS. 12 and 13, an inner end portion 18b of the left gusset 18 is housed in an inner portion 111 of the gusset joint portion 38 of the left front side frame 14. To be specific, an inner flange 108 protrudes from an inner edge of the front wall 105 of the left gusset 18 to the vehicle rear side. The inner flange 108 is formed along the inner side wall 26 of the gusset joint portion 38, the upper inclined portion 41 of the gusset joint portion 38, and the lower inclined portion 42 of the gusset joint portion 38.

Also, an upper end 108a of the inner flange 108 is coupled with an inner end portion 106a of the upper portion 106. Further, a lower end 108b of the inner flange 108 is coupled with an inner end portion 107a of the lower portion 107. Hence, the inner flange 108, the inner end portion 106a of the upper portion 106, and the inner end portion 107a of the lower portion 107 form a substantially U-shaped cross section.

In addition, an inner end portion 105a of the front wall 105, the inner flange 108, the inner end portion 106a of the upper portion 106, and the inner end portion 107a of the lower portion 107 of the left gusset 18 are housed in the inner portion 111 of the gusset joint portion 38.

In this state, the inner flange 108 is joined with the inner side wall 26 of the gusset joint portion 38, a rear end portion 41a of the upper inclined portion 41, and a rear end portion 42a of the lower inclined portion 42 (see also FIG. 3). Also, the inner end portion 106a of the upper portion 106 is joined with the upper portion 27 of the gusset joint portion 38.

Further, the inner end portion 107a of the lower portion 107 is joined with the lower portion 28 of the gusset joint portion 38.

Hence, an inner end portion 101a of the gusset main body 101 (that is, the left gusset 18) is joined with the rear end portion 41a of the upper inclined portion 41 and the rear end portion 42a of the lower inclined portion 42. In this case, the rear end portion 41a of the upper inclined portion 41 and the rear end portion 42a of the lower inclined portion 42 are included in the gusset joint portion 38 (see also FIG. 3).

Accordingly, the inner end portion 18b of the left gusset 18 is joined with the gusset joint portion 38.

Thus, the inner end portion 18b of the left gusset 18 is joined with the rear end portion 41a of the upper inclined portion 41 and the rear end portion 42a of the lower inclined portion 42. Hence, the upper ridge portion 31 and the lower ridge portion 32 (see also FIG. 3) extend from the inner end portion 18b of the left gusset 18 toward the vehicle rear side.

The upper ridge portion 31 and the lower ridge portion 32 are portions bent to have a substantially L-shaped cross section and hence have high rigidities against a load in the vehicle front-rear direction.

Hence, the impact load F3 of the small overlap collision can be efficiently transmitted to the rear load absorption portion 39 (see also FIG. 3) through the upper ridge portion 31 and the lower ridge portion 32 with high rigidities. Accordingly, the rear load absorption portion 39 can be promoted to be properly bent by the impact load F3, and hence the rear load absorption portion 39 can properly absorb the impact load F3.

In this case, the inner end portion 106a of the upper portion 106 is joined with the upper portion 27 of the gusset joint portion 38. Further, the inner end portion 107a of the lower portion 107 is joined with the lower portion 28 of the gusset joint portion 38. Hence, the left gusset 18 is strongly joined with the gusset joint portion 38 of the left front side frame 14.

Accordingly, the joint strength between the left gusset 18 and the left front side frame 14 is increased.

Referring back to FIG. 10, the front frame back plate 34 is provided at the vehicle front side of the front wall 105 of the left gusset 18. Also, the rear frame back plate 35 is provided at the vehicle rear side of the front wall 105 of the left gusset 18.

A rear end portion 34a of the front frame back plate 34 is joined with a front surface of the front wall 105 of the left gusset 18. Also, a front end portion 35a of the rear frame back plate 35 is joined with a rear surface of the front wall 105 of the left gusset 18.

That is, the front wall 105 of the left gusset 18 is sandwiched between the front frame back plate 34 and the rear frame back plate 35 in the vehicle front-rear direction. Hence, the left gusset 18 is further strongly joined with the gusset joint portion 38 of the left front side frame 14.

Accordingly, the joint strength between the left gusset 18 and the left front side frame 14 is further increased.

Also, the left front side frame 14 is formed of the two members of the frame main body 22 and the frame back plate 24. To be specific, the frame back plate 24 is divided into the front frame back plate 34 and the rear frame back plate 35.

Further, since the opening 23 of the frame main body 22 is closed with the frame back plate 24, the left front side frame 14 is formed to have the closed cross section.

Also, the left gusset 18 is formed of the two members of the gusset main body 101 and the gusset back plate 102. Further, since the opening 103 of the gusset main body 101 is closed with the gusset back plate 102, the left gusset 18 is formed to have the closed cross section.

Accordingly, the frame main body 22, the frame back plate 24, the gusset main body 101, and the gusset back plate 102 can be easily formed by pressing a steel sheet. That is, the left front side frame 14 and the left gusset 18 can be easily formed.

Further, the front wall 105 of the gusset main body 101 includes the inner flange 108, and the inner flange 108 is joined with the gusset joint portion 38. Also, the frame back plate 24 is divided into the front frame back plate 34 and the rear frame back plate 35. Further, the divided front frame back plate 34 and rear frame back plate 35 sandwich the front wall 105 in the vehicle front-rear direction.

Accordingly, the gusset main body 101 (that is, the left gusset 18) can be easily assembled with the left front side frame 14.

As shown in FIGS. 6 and 7, the front end portion 16a of the left upper member 16 is coupled with the outer end portion 18a of the left gusset 18. To be specific, a housing recess portion 114 is formed at the outer end portion 18a of the left gusset 18. The housing recess portion 114 has an upper opening 115 being open to the upper side and an outer opening 116 being open to the outside in the vehicle width direction. The front end portion 16a of the left upper member 16 is housed in the housing recess portion 114.

In the state where the front end portion 16a of the left upper member 16 is housed in the housing recess portion 114, the front end portion 16a of the left upper member 16 is joined with the housing recess portion 114. Hence, the front end portion 16a of the left upper member 16 is strongly coupled with the outer end portion 18a of the left gusset 18.

As shown in FIG. 10, the front end portion 16a of the left upper member 16 is joined with the gusset joint portion 38 (the front end portion) of the left front side frame 14 through the left gusset 18 from the outside in the vehicle width direction. In this case, the front end portion 16a of the left upper member 16 is strongly coupled with the outer end portion 18a of the left gusset 18.

Hence, the impact load F3 input to the front end portion 16a of the left upper member 16 due to the small overlap collision can be efficiently transmitted as a load F4 to the left gusset 18.

Also, the inner end portion 18b of the left gusset 18 is joined with the gusset joint portion 38. Further, the front wall 105 of the left gusset 18 is sandwiched between the front frame back plate 34 and the rear frame back plate 35 in the vehicle front-rear direction. Hence, the left gusset 18 is strongly coupled with the gusset joint portion 38 of the left front side frame 14.

Hence, the load F4 transmitted to the left gusset 18 can be efficiently transmitted as a load F5 to the rear load absorption portion 39 through the gusset joint portion 38. Accordingly, the impact load F3 input to the front end portion 16a of the left upper member 16 can be reliably dispersed to the left front side frame 14 and the left upper member 16.

The rear load absorption portion 39 can be deformed in a bent manner by the load F5 dispersed to the left front side frame 14 (that is, the rear load absorption portion 39). That is, while the total length of the bumper beam 19 is held small, the rear load absorption portion 39 can properly absorb the impact load F3 due to the small overlap collision.

Accordingly, while the weight of the bumper beam 19 is held small, the impact load F5 due to the small overlap collision can be properly absorbed, and the weight of the vehicle Ve can be decreased.

As shown in FIG. 4, the left gusset 18 extends in an inclined manner from the gusset joint portion 38 to the vehicle front side and to the outside in the vehicle width direction. Hence, the outer end portion 18a of the left gusset 18 is arranged at the vehicle front side. Further, the front end portion 16a of the left upper member 16 (see also FIG. 6) is coupled with the outer end portion 18a of the left gusset 18. Hence, the front end portion 16a of the left upper member 16 extends to the vehicle front side, and a large length of the left upper member 16 can be ensured.

Accordingly, a large deformation amount of the left upper member 16 can be ensured, and the amount of absorbing the impact load F3 by the left upper member 16 can be increased.

Further, since the left gusset 18 extends in an inclined manner to the vehicle front side and to the outside in the vehicle width direction, the impact load F3 input to the front end portion 16a of the left upper member 16 can be efficiently transmitted to the left gusset 18.

Accordingly, the impact load F3 can be further properly transmitted to the rear load absorption portion 39 of the left front side frame 14.

Referring back to FIG. 10, the opening 116 is formed at the front end portion 14a of the front load absorption portion 37 of the left front side frame 14, and the attachment bracket 118 is inserted into the opening 116 from the vehicle front side. The attachment bracket 118 includes a cylindrical portion 121 that is inserted into the opening 116 from the vehicle front side, and a flange 122 formed at a front end of the cylindrical portion 121.

In a state where the cylindrical portion 121 of the attachment bracket 118 is inserted into the opening 116, the attachment bracket 118 is joined with the front end portion 14a of the left front side frame 14. Also, the flange 122 of the attachment bracket 118 is attached to the left end portion 19a of the bumper beam 19 from a back surface. Accordingly, the front end portion 14a of the left front side frame 14 is attached to the left end portion 19a of the bumper beam 19 through the attachment bracket 118.

That is, the left end portion 19a of the bumper beam 19 is strongly attached to the front load absorption portion 37 of the left front side frame 14. Hence, the impact load F1 input to the bumper beam 19 can be reliably transmitted to the front load absorption portion 37 through the attachment bracket 118.

Accordingly, the axial crush of the front load absorption portion 37 can be properly promoted.

Next, an example in which, if an impact load F6 is input to the bumper beam 19 due to the front collision of the vehicle Ve, the left front side frame 14 absorbs the input impact load F6 is described with reference to FIGS. 14A and 14B.

Figure 14A:
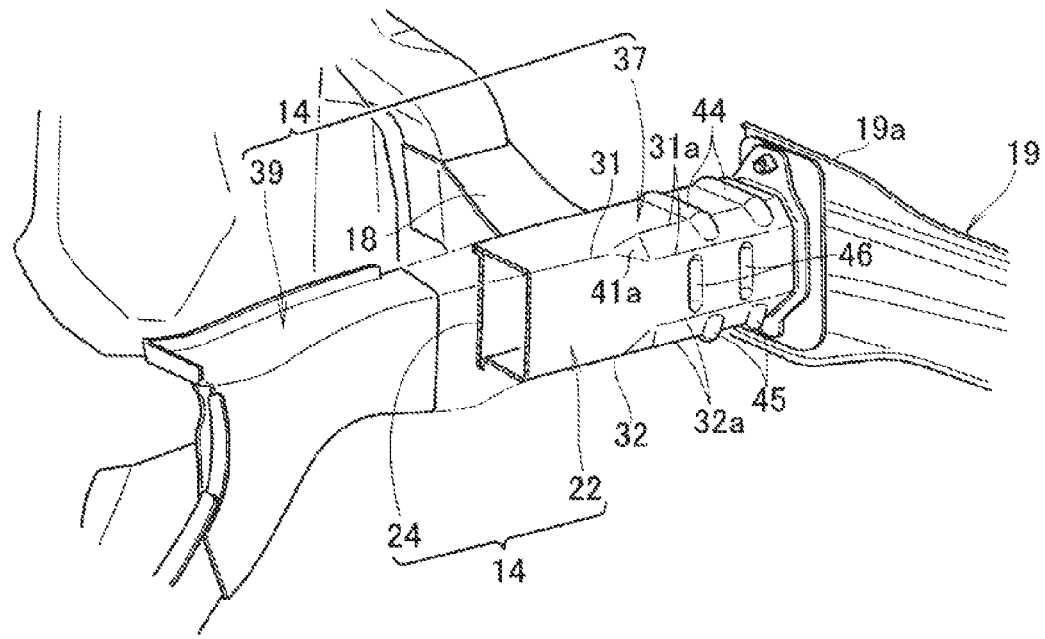
FIGS. 14A and 14B are illustrations explaining an example of absorbing an impact load by a front collision of a vehicle according to the embodiment of the present disclosure.

As shown in FIG. 14A, the plurality of upper horizontal beads 44, the plurality of lower horizontal beads 45, the plurality of vertical beads 46, and the plurality of vertical beads 47 are formed at the front load absorption portion 37 of the left front side frame 14.

Also, the upper ridge portion 31 is branched into the two ridge portions 31a at the front load absorption portion 37. Further, the lower ridge portion 32 is branched into the two ridge portions 32a.

Figure 14B:
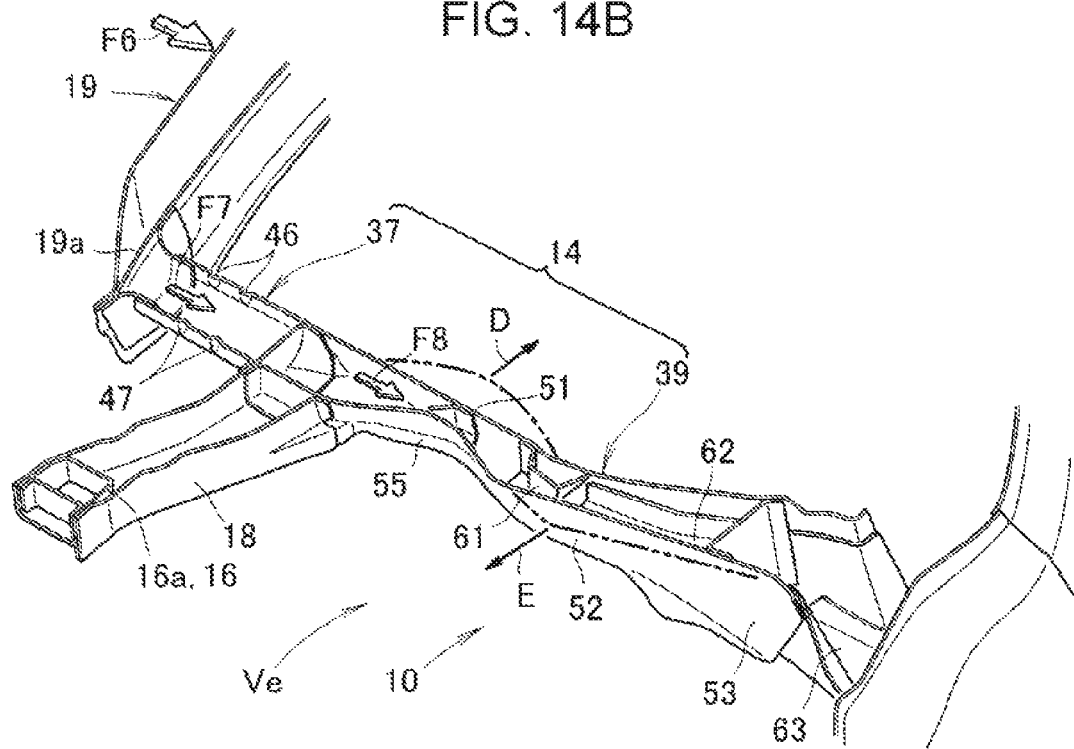

As shown in FIG. 14B, the impact load F6 is input to the bumper beam 19 from the front of the vehicle Ve. The input impact load F6 is transmitted as a load F7 from the left end portion 19a of the bumper beam 19 to the front load absorption portion 37. The front load absorption portion 37 is axially crushed by the transmitted load F7, and the front load absorption portion 37 properly absorbs the impact load F7.

Hence, the front load absorption portion 37 can absorb initial-phase energy of the impact load F6 (that is, the load F7).

Further, after the front load absorption portion 37 absorbs the initial-phase energy of the load F7, the residual load is transmitted as a load F8 to the rear load absorption portion 39. The first bend portion 51, the second bend portion 52, and the third bend portion 53 of the rear load absorption portion 39 are bent by the transmitted load F8.

To be specific, the first bend portion 51 of the rear load absorption portion 39 is bent substantially horizontally by the transmitted load F8 as indicated by an imaginary line in an arrow D direction. Further, the second bend portion 52 of the rear load absorption portion 39 is bent substantially horizontally as indicated by an imaginary line in an arrow E direction.

In this way, since the rear load absorption portion 39 is bent substantially horizontally at the first bend portion 51, the second bend portion 52, and the third bend portion 53, later-phase energy of the impact load F6 (that is, the impact load F8) can be absorbed.

Then, an example in which, if an impact load F9 is input to the left upper member 16 due to the small overlap collision of the vehicle Ve, the left front side frame 14 and the left upper member 16 absorb the input impact load F9 is described with reference to FIGS. 15A and 15B.

Figure 15A:
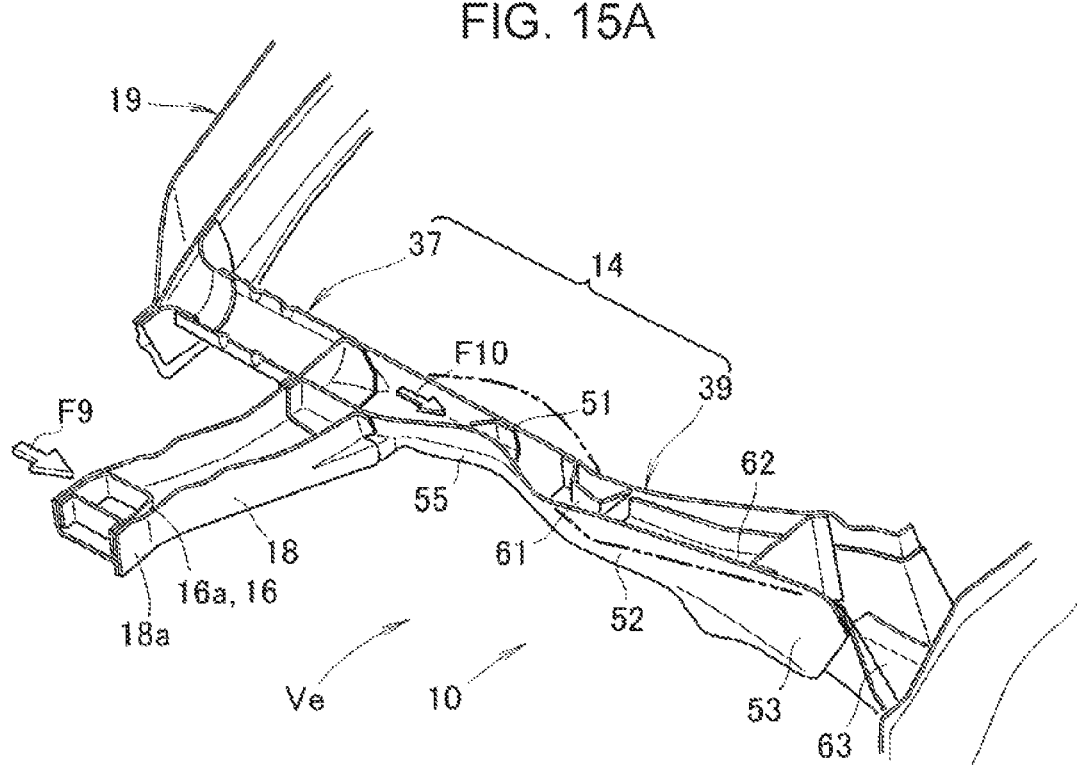
FIGS. 15A and 15B are illustrations explaining an example of absorbing an impact load due to a small overlap collision of a vehicle according to the embodiment of the present disclosure.

As shown in FIG. 15A, the impact load F9 is input to the front end portion 16a of the left upper member 16 due to the small overlap collision of the vehicle Ve. Part of the impact load F9 input to the front end portion 16a of the left upper member 16 is transmitted as a load F10 to the rear load absorption portion 39 of the left front side frame 14 through the left gusset 18.

Also, the residual part of the load input to the front end portion 16a of the left upper member 16 is transmitted as a load F11 (see FIG. 15B) to the front member 82 of the left upper member 16.

Since the load F10 is transmitted to the rear load absorption portion 39 of the left front side frame 14, as described in FIG. 14B, the first bend portion 51, the second bend portion 52, and the third bend portion 53 of the rear load absorption portion 39 are bent substantially horizontally by the load F10 (indicated by imaginary lines).

Accordingly, the rear load absorption portion 39 (that is, the left front side frame 14) can properly absorb the load F10 transmitted to the rear load absorption portion 39.

Figure 15B:
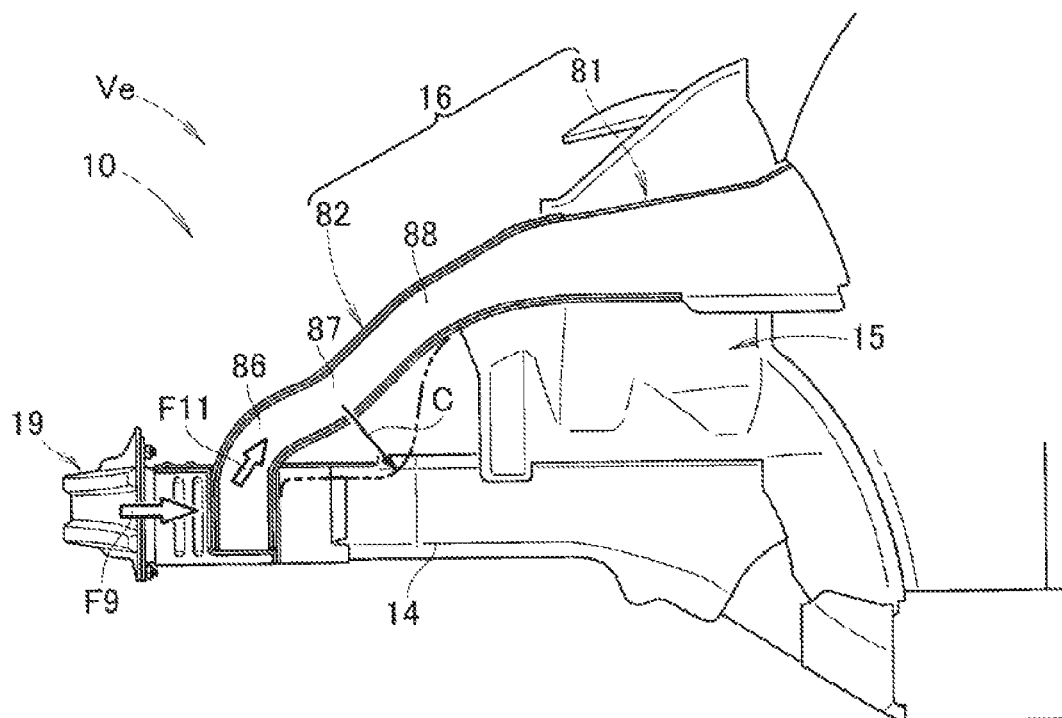

Also, as shown in FIG. 15B, the load F11 is transmitted to the front member 82 of the left upper member 16. In this case, the front member 82 is formed in a substantially M shape, and includes the three curve portions of the front curve portion 86, the center curve portion 87, and the rear curve portion 88.

Hence, the three portions of the front curve portion 86, the center curve portion 87, and the rear curve portion 88 are largely deformed in a bent manner by the load F11 transmitted to the front member 82, as indicated by an imaginary line in the arrow C direction. That is, the amount of absorbing the load F11 by the front member 82 (that is, the left upper member 16) can be increased.

Since the amount of absorbing the loaf F11 by the left upper member 16 is increased, the left upper member 16 can properly absorb the load F11 transmitted to the front member 82.

In this way, the impact loaf F9 input to the front end portion 16a of the left upper member 16 due to the small overlap collision can be dispersed into the rear load absorption portion 39 of the left front side frame 14 and the front member 82 of the left upper member 16.

Further, the rear load absorption portion 39 can properly absorb the load F10 dispersed to the rear load absorption portion 39. In addition, the front member 82 can properly absorb the load F11 transmitted to the front member 82.

Accordingly, the left front side frame 14 and the left upper member 16 can properly absorb the impact load F9 input to the front end portion 16a of the left upper member 16 due to the small overlap collision.

The vehicle-body front structure according to the present disclosure is not limited to the above-described embodiment, and may be properly modified and improved.

For example, in the above-described embodiment, the example has been described in which the inclined portion 91 is formed to the adjacent center curve portion 87 and rear curve portion 88 among the three curve portions of the front curve portion 86, the center curve portion 87, and the rear curve portion 88. However, it is not limited thereto.

For example, the inclined portion 91 may be formed to the front curve portion 86 and the center curve portion 87.

Also, in the above-described embodiment, the example has been described in which the inclined portion 91 is formed at the upper inner ridge portion 78. However, it is not limited thereto. An inclined portion may be formed at the upper outer ridge portion 92.

Further, in the above-described embodiment, the example has been described in which the second bend portion 52 is formed by using the strength difference between the first reinforcement member 61 and the second reinforcement member 62, and the third bend portion 53 is formed by using the strength difference between the second reinforcement member 62 and the third reinforcement member 63. However, it is not limited thereto.

For example, the second bend portion 52 and the third bend portion 53 may be formed by providing ribs that promote the rear load absorption portion 39 to be bent.

Also, the shapes and configurations of the vehicle-body front structure, the left and right front side frames, the left and right damper housings, the left and right upper members, the left and right gussets, the bumper beam, the frame main body, the frame back plate, the upper ridge portion, the lower ridge portion, the front and rear frame back plates, the front load absorption portion, the rear load absorption portion, the upper inclined portion, the lower inclined portion, the upper and lower horizontal beads, the inner and outer vertical beads, the first to third bend portions, the recess portion, the left front wheel, the first to third reinforcement members, the gusset main body, the gusset back plate, the inner flange, the housing recess portion, the attachment bracket, and other members described in the embodiment are not limited to those exemplarily described, and may be properly modified.

For example, the present disclosure is preferably applied to an automobile having a vehicle-body front structure in which upper members are coupled with left and right front side frames through gussets. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

We claim:

1. A vehicle-body front structure comprising:
left and right front side frames each having a front end portion, an inner side wall, and an outer side wall;
a bumper beam bridged between the front end portions of the left and right front side frames;
left and right gussets respectively extending from corresponding one of the front side frames to outside in a vehicle width direction, and each having an outer end portion;
left and right upper members each including a front end portion joined to corresponding one of the outer end portions of the left and right gussets,
wherein the front side frames each include
a front load absorption portion having a first front end portion coupled with the bumper beam, and configured to be axially crushed by an impact load that is input to the bumper beam from a vehicle front side, and
a rear load absorption portion provided at a vehicle rear side of the gusset, and configured to be bent by the impact load, and
wherein, each of the gussets includes a front wall being:
housed in an inner portion of the corresponding front side frame joined to the inner side wall of the corresponding front side frame, and
sandwiched by the outer side wall of the corresponding front side frame in a vehicle front-rear direction,
wherein the front side frames each include
a frame main body having a substantially U-shaped cross section being open to the outside in the vehicle width direction, and
a frame back plate constituting the outer side wall and closing the opening of the frame main body,
wherein the frame main body and the frame back plate cause the front side frame to have a closed cross section,
wherein the gussets each include
a gusset main body having a substantially U-shaped cross section being open to the vehicle rear side, and
a gusset back plate closing the opening of the gusset main body, wherein the gusset main body and the gusset back plate cause the gusset to have a closed cross section,
wherein the gusset main body includes the front wall having an inner flange, the frame main body includes the inner side wall, and the inner flange of the front wall is joined to the inner side wall of the frame main body, and wherein the frame back plate includes a front frame back plate and a rear frame back plate, and the front wall is sandwiched between the front frame back plate and the rear frame back plate in the vehicle front-rear direction.

2. The vehicle-body front structure according to claim 1, wherein the frame main body includes
the inner side wall having an upper edge and a lower edge,
an upper portion protruding from the upper edge of the inner side wall to the outside in the vehicle width direction, and
a lower portion protruding from the lower edge of the inner side wall to the outside in the vehicle width direction,
wherein the upper portion and the lower portion are joined to the gusset.

3. The vehicle-body front structure according to claim 1, wherein the front load absorption portion includes
a plurality of horizontal beads extending in the vehicle width direction, and
a plurality of vertical beads provided at positions shifted from the horizontal beads by a predetermined pitch in the vehicle front-rear direction and extending in an up-down direction.

4. The vehicle-body front structure according to claim 1, further comprising an attachment bracket inserted into and joined to an opening of the front load absorption portion, the attachment bracket being attached to the bumper beam.

5. The vehicle-body front structure according to claim 1, wherein the gussets each extend from the corresponding one of the front side frames to the vehicle front side and to the outside in the vehicle width direction in an inclined manner,
wherein each of the outer end portions of the gussets includes a housing recess portion configured to house the front end portion of the upper member, and
wherein, in a state where the front end portion of the upper member is housed in the housing recess portion, the front end portion of the upper member is joined to the housing recess portion.

6. The vehicle-body front structure according to claim 1, wherein the rear load absorption portion includes
a first bend portion provided on the vehicle rear side of the gusset, and having a recess portion in which the outer side wall of the front side frame is recessed inward in the vehicle width direction,
a second bend portion disposed on the vehicle rear side of the first bend portion, and capable of being bent in the vehicle width direction, and
a third bend portion disposed on the vehicle rear side of the second bend portion, and capable of being bent in the vehicle width direction.

7. The vehicle-body front structure according to claim 1, wherein the front wall of the gusset main body extends between the inner side wall of the frame main body and the frame back plate.

8. The vehicle-body front structure according to claim 7, wherein the front frame back plate includes a rear end flange at a rear end thereof and the rear frame back plate includes a front end flange at a front end thereof, and
the front wall is sandwiched between the rear end flange and the front end flange.

9. A vehicle comprising the vehicle-body front structure according to claim 1.

10. A vehicle-body front structure comprising:
left and right front side frames each having a front end portion, an inner side wall, and an outer side wall;

a bumper beam bridged between the front end portions of the left and right front side frames;

left and right gussets respectively extending from corresponding one of the front side frames to outside in a vehicle width direction, and each having an outer end portion;

left and right upper members each including a front end portion joined to corresponding one of the outer end portions of the left and right gussets, wherein the front side frames each include a front load absorption portion having a first front end portion coupled with the bumper beam, and configured to be axially crushed by an impact load that is input to the bumper beam from a vehicle front side, and a rear load absorption portion provided at a vehicle rear side of the gusset, and configured to be bent by the impact load, and wherein, each of the gussets includes a front wall being:

housed in an inner portion of the corresponding front side frame joined to the inner side wall of the corresponding front side frame, and sandwiched by the outer side wall of the corresponding front side frame in a vehicle front-rear direction, wherein the front side frames each include a frame main body having a substantially U-shaped cross section being open to the outside in the vehicle width direction, and a frame back plate constituting the outer side wall and closing the opening of the frame main body, wherein the frame main body and the frame back plate cause the front side frame to have a closed cross section, wherein the gussets each include a gusset main body having a substantially U-shaped cross section being open to the vehicle rear side, and a gusset back plate closing the opening of the gusset main body, wherein the gusset main body and the gusset back plate cause the gusset to have a closed cross section, wherein the gusset main body includes the front wall having an inner flange, the frame main body includes the inner side wall, and the inner flange of the front wall is joined to the inner side wall of the frame main body, and wherein the frame back plate includes a front frame back plate and a rear frame back plate, and the front wall is sandwiched between the front frame back plate and the rear frame back plate in the vehicle front-rear direction, wherein the frame main body includes the inner side wall having an upper edge and a lower edge, an upper portion protruding from the upper edge of the inner side wall to the outside in the vehicle width direction, and a lower portion protruding from the lower edge of the inner side wall to the outside in the vehicle width direction, wherein the upper portion and the lower portion are joined to the gusset, wherein the frame main body includes an upper ridge portion constituted by intersection of the inner side wall and the upper portion, and a lower ridge portion constituted by intersection of the inner side wall and the lower portion, wherein each of the ridge portions is branched into two ridges at the front load absorption portion to have an inclined portion between the two ridges, and wherein the inclined portion has a rear end portion, and the gusset main body is joined to the rear end portion of the inclined portion.

11. The vehicle-body front structure according to claim 10, wherein a plurality of horizontal beads or a plurality of vertical beads extend to intersect the inclined portion.

12. The vehicle-body front structure according to claim 1, wherein the front frame back plate butts the front wall and the rear frame back plate butts the front wall such that the front frame back plate and the rear frame back plate are opposite to each other via the front wall.

* * * * *